US010715767B2

(12) United States Patent
Takagi

(10) Patent No.: US 10,715,767 B2
(45) Date of Patent: Jul. 14, 2020

(54) INFORMATION TRANSMISSION DEVICE, INFORMATION TRANSMISSION METHOD, AND INFORMATION TRANSMISSION SYSTEM

(71) Applicant: SONY SEMICONDUCTOR SOLUTIONS CORPORATION, Kanagawa (JP)

(72) Inventor: Yoshimitsu Takagi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/464,865

(22) PCT Filed: Dec. 8, 2017

(86) PCT No.: PCT/JP2017/044112
§ 371 (c)(1),
(2) Date: May 29, 2019

(87) PCT Pub. No.: WO2018/116863
PCT Pub. Date: Jun. 28, 2018

(65) Prior Publication Data
US 2019/0327453 A1 Oct. 24, 2019

(30) Foreign Application Priority Data
Dec. 22, 2016 (JP) ................. 2016-248801

(51) Int. Cl.
H04N 7/18 (2006.01)
G06F 1/3209 (2019.01)
(Continued)

(52) U.S. Cl.
CPC ........... *H04N 7/188* (2013.01); *G06F 1/3209* (2013.01); *G06F 1/3212* (2013.01); *G08B 25/10* (2013.01); *H04N 7/181* (2013.01)

(58) Field of Classification Search
CPC ... H04N 21/4532; G06F 1/3212; H04W 4/80; G01C 21/3484
See application file for complete search history.

(56) References Cited

U.S. PATENT DOCUMENTS 6,983,306 B1 * 1/2006 Sameshima ............ G05B 15/02
709/201
9,631,944 B2 * 4/2017 Cho ....................... H04W 4/029
(Continued)

FOREIGN PATENT DOCUMENTS

JP 2003-196770 A 7/2003
JP 2003-319375 A 11/2003
(Continued)

OTHER PUBLICATIONS

International Search Report and Written Opinion of PCT Application No. PCT/JP2017/044112, dated Mar. 6, 2018, 12 pages of ISRWO.

Primary Examiner — Paulos M Natnael
(74) Attorney, Agent, or Firm — Chip Law Group

(57) ABSTRACT

The present technology relates to an information transmission device, an information transmission method, and an information transmission system that smoothes the power consumption of an entire system. The information transmission device includes a detection unit that detects occurrence of a specific event based on the surrounding information acquired, a generation unit that generates transmission data from the surrounding information, a management unit that manages profile information at least including a remaining battery level, a decision unit that decides, based on the profile information, a destination of the transmission data generated, and a transmission unit that transmits the transmission data to the destination decided. The present technology is applicable to a monitoring system, for example.

11 Claims, 20 Drawing Sheets

(51) Int. Cl.
 *G06F 1/3212* (2019.01)
 *G08B 25/10* (2006.01)

(56) References Cited

U.S. PATENT DOCUMENTS

| | | | | |
|---|---|---|---|---|
| 2003/0202099 | A1* | 10/2003 | Nakamura | H04N 5/77 348/153 |
| 2006/0004917 | A1* | 1/2006 | Wang | H04L 67/303 709/223 |
| 2007/0264948 | A1* | 11/2007 | Jansson | G06F 1/3203 455/127.5 |
| 2012/0086804 | A1* | 4/2012 | Ishibashi | H04N 7/18 348/143 |
| 2012/0309376 | A1* | 12/2012 | Huang | H04M 1/72572 455/418 |
| 2014/0111336 | A1* | 4/2014 | Lee | G08B 13/1672 340/540 |
| 2016/0156768 | A1* | 6/2016 | Kim | H04M 1/72533 455/420 |
| 2017/0095674 | A1* | 4/2017 | Hresko | A61N 1/3993 |
| 2018/0367843 | A1* | 12/2018 | Han | H04N 21/4131 |

FOREIGN PATENT DOCUMENTS

| | | |
|---|---|---|
| JP | 2004-128560 A | 4/2004 |
| JP | 2004-140623 A | 5/2004 |
| JP | 2009-219083 A | 9/2009 |
| JP | 2011-228884 A | 11/2011 |
| JP | 2012-070308 A | 4/2012 |
| JP | 2014-022843 A | 2/2014 |

* cited by examiner

FIG. 3

| CLASSIFICATION | ITEM | DESCRIPTION | ACCEPTANCE DETERMINATION | REPLY |
|---|---|---|---|---|
| APPARATUS INFORMATION | MAC ADDRESS | PHYSICAL ADDRESS UNIQUELY ASSIGNED TO APPARATUS. MAC ADDRESS IS USED FOR IDENTIFYING APPARATUS IN NETWORK. | | ● |
| APPARATUS INFORMATION | INSTALLATION POSITION | COORDINATE INFORMATION OBTAINED THROUGH POSITION MEASUREMENT BY GPS, FOR EXAMPLE. IT IS ASSUMED THAT, UNDER ENVIRONMENT WHERE POSITION CANNOT BE MEASURED BY GPS, SUCH AS INDOOR ENVIRONMENT, INSTALLATION POSITION MAY BE SET BY WORKER WHEN HE/SHE INSTALLS CAMERA. INSTALLATION POSITION IS VALUE FOR CALCULATING DISTANCE BETWEEN CAMERAS, AND HENCE IS NOT NECESSARILY VALUE OBTAINED BY GPS AND MAY BE RELATIVE COORDINATE OBTAINED FROM CERTAIN REFERENCE POSITION. | | ● |
| EVENT INFORMATION | DETECTION INTERVAL | MOVING AVERAGE OF EVENT DETECTION INTERVALS. NUMBER OF PERIODS (NUMBER OF PIECES OF DATA) TO BE AVERAGED IS NOT CLEARLY DESCRIBED IN PRESENT INVENTION BECAUSE OPTIMUM VALUE THEREOF IS DIFFERENT BETWEEN OBSERVATION TARGETS. | | ● |
| EVENT INFORMATION | TIME-PERIOD-BASED HISTORY | TIME-PERIOD-BASED HISTORY HOLDS EVENT HISTORY BASED ON TIME PERIOD AND IS USED FOR DETERMINING WHETHER OFF PERIOD HAS ARRIVED. | ● | |
| POWER SUPPLY INFORMATION | REMAINING BATTERY LEVEL | CURRENT REMAINING BATTERY LEVEL. IT IS ONLY NECESSARY TO MAKE COMPARISON BETWEEN CAMERAS AND HENCE UNIT OF REMAINING BATTERY LEVEL VALUE IS NOT LIMITED. | ● | ● |
| POWER SUPPLY INFORMATION | THRESHOLD | BATTERY LEVEL THRESHOLD THAT IS USED FOR DETERMINATION ON PROXY TRANSMISSION REQUEST AND ACCEPTANCE THEREOF WITH ANOTHER CAMERA. IN PRESENT INVENTION, REMAINING BATTERY LEVEL IS DIVIDED INTO THREE, NAMELY, HIGH, MEDIUM, AND LOW WITH TWO THRESHOLDS AS EXAMPLE, BUT IS NOT NECESSARILY DIVIDED INTO THREE. NUMBER OF DIVISIONS MAY BE DETERMINED DEPENDING ON USE CASE OR BATTERY CHARACTERISTICS. | ● | |
| COMMUNICATION INFORMATION | TRANSMISSION STATE | STATE MANAGEMENT FOR MANAGING WHETHER OR NOT DATA IS BEING TRANSMITTED TO SERVER. | ● | |
| COMMUNICATION INFORMATION | TRANSMISSION BUFFER STATE | NUMBER OF PIECES OF TRANSMISSION DATA BEING QUEUED. | ● | |

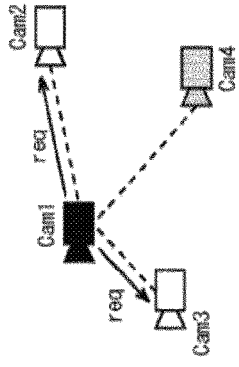

REQUEST PROXY TRANSMISSION

FIG. 10A

SEND REPLY INDICATING THAT PROXY TRANSMISSION IS AVAILABLE WHEN MONITORING DEVICE HAS HIGH REMAINING BATTERY LEVEL AND IS TRANSMITTING NO DATA

FIG. 10B

REQUEST PROFILE INFORMATION (REMAINING BATTERY LEVEL AND INSTALLATION POSITION)

FIG. 10C

SELECT, AS REQUEST DESTINATION OF PROXY TRANSMISSION, MONITORING DEVICE THAT HAS HIGH REMAINING BATTERY LEVEL AND IS CLOSEST TO MONITORING DEVICE IN QUESTION

FIG. 10D

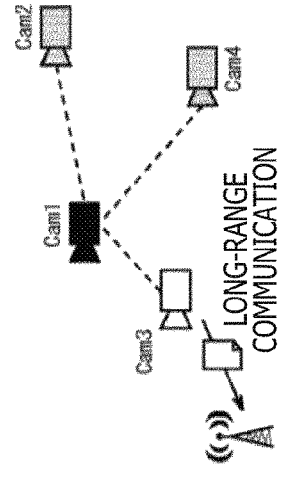

TRANSMIT TRANSMISSION DATA TO SELECTED REQUEST DESTINATION

FIG. 10E

REQUEST DESTINATION TRANSMITS TRANSMISSION DATA TO SERVER

FIG. 10F

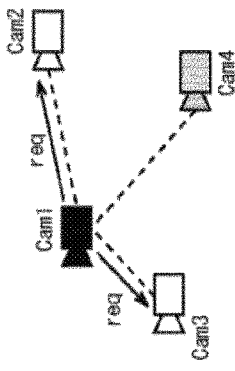
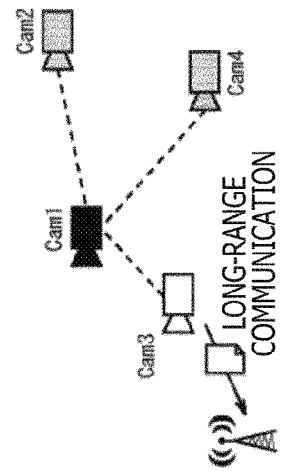

FIG. 12A — REQUEST PROXY TRANSMISSION

FIG. 12B — SEND REPLY INDICATING THAT PROXY TRANSMISSION IS AVAILABLE WHEN MONITORING DEVICE HAS HIGH REMAINING BATTERY LEVEL AND IS TRANSMITTING NO DATA

FIG. 12C — REQUEST PROFILE INFORMATION (REMAINING BATTERY LEVEL, INSTALLATION POSITION, AND EVENT INTERVAL)

FIG. 12D — SELECT, AS REQUEST DESTINATION OF PROXY TRANSMISSION, MONITORING DEVICE THAT HAS HIGH REMAINING BATTERY LEVEL AND LONG EVENT DETECTION INTERVAL, AND IS CLOSEST TO MONITORING DEVICE IN QUESTION

FIG. 12E — TRANSMIT TRANSMISSION DATA TO SELECTED REQUEST DESTINATION

FIG. 12F — REQUEST DESTINATION TRANSMITS TRANSMISSION DATA TO SERVER

INFORMATION TRANSMISSION DEVICE, INFORMATION TRANSMISSION METHOD, AND INFORMATION TRANSMISSION SYSTEM

CROSS REFERENCE TO RELATED APPLICATIONS

This application is a U.S. National Phase of International Patent Application No. PCT/JP2017/044112 filed on Dec. 8, 2017, which claims priority benefit of Japanese Patent Application No. JP 2016-248801 filed in the Japan Patent Office on Dec. 22, 2016. Each of the above-referenced applications is hereby incorporated herein by reference in its entirety.

TECHNICAL FIELD

The present technology relates to an information transmission device, an information transmission method, and an information transmission system, and in particular, to an information transmission device, an information transmission method, and an information transmission system that make it possible to smooth the power consumption of an entire information transmission system including a plurality of information transmission devices.

BACKGROUND ART

Hitherto, there has been a monitoring system including a plurality of monitoring cameras and configured to transmit image data taken by each monitoring camera to a server. Further, there has been a technology that allows the monitoring system to record the image data that is an imaging result and transmit the image data to the server only in a case where the monitoring camera detects a specific event (detects suspicious persons, for example), to thereby achieve power saving (see, for example, PTL 1).

CITATION LIST

Patent Literature

[PTL 1]
JP 2004-140623A

SUMMARY

Technical Problems

In the monitoring system described above, the power consumption of a monitoring camera having an imaging range in which the specific event occurs in a concentrated manner is increased compared to that of another monitoring camera. Thus, when the monitoring system is seen as a whole, remaining battery levels are not uniform, with the result that battery charging frequencies and battery replacement frequencies are different between the monitoring cameras, which is not preferred in terms of system maintenance.

Further, it is conceivable to provide an individual solar panel to each monitoring camera, thereby enabling the batteries of the monitoring cameras to be charged. Even in this case, however, there is concern that the remaining battery levels are not uniform due to a difference in sunshine condition that depends on the installation position of the solar panel of each monitoring camera.

The present technology has been made in view of the circumstances described above, and makes it possible to smooth the power consumption of an entire information transmission system including a plurality of information transmission devices such as monitoring cameras.

Solution to Problems

An information transmission device that is a first aspect of the present technology includes: an acquisition unit configured to acquire surrounding information; a detection unit configured to detect occurrence of a specific event based on the surrounding information acquired; a generation unit configured to generate transmission data from the surrounding information when the occurrence of the specific event is detected; a management unit configured to manage profile information at least including a remaining battery level; a decision unit configured to decide, based on the profile information, a destination of the transmission data generated; and a transmission unit configured to transmit the transmission data to the destination decided.

The decision unit can decide, based on the profile information, whether or not to request proxy transmission. The decision unit can decide another information transmission device as the destination of the transmission data in a case where the decision unit decides to request the proxy transmission. The decision unit can decide a server as the destination of the transmission data in a case where the decision unit decides not to request the proxy transmission. The transmission unit can transmit, in the case where another information transmission device is decided as the destination of the transmission data, the transmission data to the other information transmission device by short-range communication. The transmission unit can transmit, in the case where the server is decided as the destination of the transmission data, the transmission data to the server by long-range communication.

The information transmission device that is the first aspect of the present technology can further include a holding unit configured to hold the transmission data that has not been transmitted by the transmission unit yet. The decision unit can decide, based on the number of pieces of the transmission data held by the holding unit, whether or not to request the proxy transmission.

In the case where the decision unit decides to request the proxy transmission, the decision unit can request the proxy transmission from other information transmission devices each of which is a target of the short-range communication, and select another information transmission device that is to serve as a request destination of the proxy transmission from other information transmission devices that have sent a reply indicating that the proxy transmission is available in response to the request.

In the case where the decision unit decides to request the proxy transmission, the decision unit can request the proxy transmission from other information transmission devices each of which is the target of the short-range communication, and select, from other information transmission devices that have sent the reply indicating that the proxy transmission is available in response to the request, another information transmission device that is to serve as the request destination of the proxy transmission based on the profile information of the other information transmission devices.

The information transmission device that is the first aspect of the present technology can further include a determination unit configured to determine, in a case where the information transmission device receives a request of the proxy transmission from another information transmission device, whether or not the proxy transmission requested is available based on the profile information of the information transmission device.

In a case where the determination unit determines that the proxy transmission is available and the information transmission device is selected as a request destination by a request source of the proxy transmission, the transmission unit can transmit the transmission data transmitted from the request source by the short-range communication to the server by the long-range communication.

The profile information can include, in addition to the remaining battery level, at least one of identification information, position information, a detection interval of the specific event, a time-period-based history, a threshold of the remaining battery level, a transmission state, or transmission buffer information.

The acquisition unit can include an imaging unit configured to acquire image data as the surrounding information.

The acquisition unit can include a sensor unit configured to measure, as the surrounding information, at least one of sound, temperature, humidity, pressure, acceleration, magnetism, or a radiation dose.

An information transmission method that is the first aspect of the present technology is an information transmission method for an information transmission device including an acquisition unit configured to acquire surrounding information. The information transmission method includes the following steps that are executed by the information transmission device: a detection step of detecting occurrence of a specific event based on the surrounding information acquired; a generation step of generating transmission data from the surrounding information when the occurrence of the specific event is detected; a decision step of deciding, based on profile information at least including a remaining battery level, a destination of the transmission data generated; and a transmission step of transmitting the transmission data to the destination decided.

In the first aspect of the present technology, the occurrence of the specific event is detected on the basis of the acquired surrounding information, and the transmission data is generated from the surrounding information when the occurrence of the specific event is detected. Further, the destination of the generated transmission data is decided on the basis of the profile information at least including the remaining battery level, and the transmission data is transmitted to the decided destination.

An information transmission system that is a second aspect of the present technology is an information transmission system including a plurality of information transmission devices capable of performing short-range communication. Each of the plurality of information transmission devices includes: an acquisition unit configured to acquire surrounding information; a detection unit configured to detect occurrence of a specific event based on the surrounding information acquired; a generation unit configured to generate transmission data from the surrounding information when the occurrence of the specific event is detected; a management unit configured to manage profile information at least including a remaining battery level; a decision unit configured to decide, based on the profile information, whether or not to request proxy transmission, and decide another information transmission device as a destination of the transmission data in a case where the decision unit decides to request the proxy transmission and decide a server as the destination of the transmission data in a case where the decision unit decides not to request the proxy transmission; and a transmission unit configured to transmit the transmission data to the destination decided. An information transmission device that is to serve as a request source of the proxy transmission transmits the transmission data to an information transmission device that is to serve as a request destination of the proxy transmission by short-range communication. The information transmission device that is to serve as the request destination of the proxy transmission transmits the transmission data transmitted from the information transmission device that is to serve as the request source of the proxy transmission to the server by long-range communication.

In the second aspect of the present technology, the information transmission device that is to serve as the request source of the proxy transmission transmits the transmission data to the information transmission device that is to serve as the request destination of the proxy transmission by the short-range communication, and the information transmission device that is to serve as the request destination of the proxy transmission transmits the transmission data transmitted from the information transmission device that is to serve as the request source of the proxy transmission to the server by the long-range communication.

Advantageous Effects of Invention

According to the first aspect of the present technology, the destination of the transmission data can be changed depending on the remaining battery level. The power consumption can therefore be reduced.

According to the second aspect of the present technology, the power consumption of the entire system can be smoothed.

BRIEF DESCRIPTION OF DRAWINGS

FIG. 3 is a diagram illustrating the items of profile information.

FIGS. 10A, 10B, 10C, 10D, 10E, and 10F are diagrams illustrating a first operation example in a case where a request destination of the proxy transmission is selected.

FIGS. 12A, 12B, 12C, 12D, 12E, and 12F are diagrams illustrating a second operation example in the case where the request destination of the proxy transmission is selected.

DESCRIPTION OF EMBODIMENT

Now, the best mode for carrying out the present technology (hereinafter referred to as "embodiment") is described in detail with reference to the drawings.

<Configuration Example of Information Transmission System>

Figure 1:
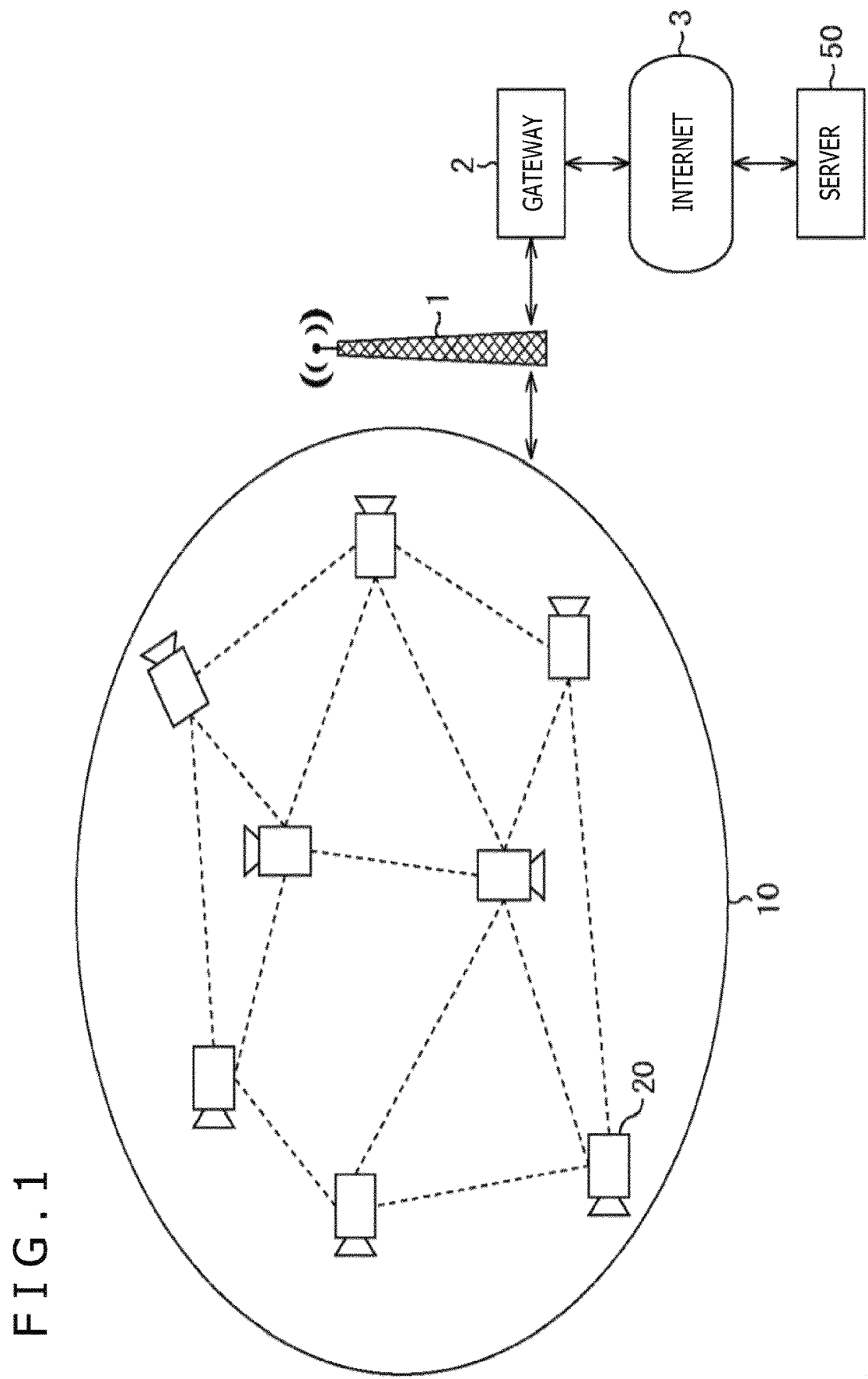
FIG. 1 is a block diagram illustrating a configuration example of an information transmission system to which the present technology is applied.

FIG. 1 illustrates a configuration example of a monitoring system that is an embodiment of the present technology. This monitoring system includes a plurality of monitoring devices 20 connected to each other, and notifies, via a base station 1, a gateway 2, and the Internet 3, a server 50 of information that a sensor of each of the monitoring devices 20 acquires (for example, image data obtained as the imaging result). A monitoring system 10 is applicable to various fields described later.

The monitoring device 20 communicates, to another monitoring device 20 of the monitoring system 10, the image data and profile information at least including a remaining battery level with the use of predetermined short-range communication (Bluetooth (registered trademark), ZigBee (trademark), or Wi-Fi (trademark), for example). In addition, the monitoring device 20 transmits, for example, the image data to the server 50 via the base station 1 and the like with the use of predetermined long-range communication (LTE, for example).

Specifically, the monitoring device 20 transmits, in a case where its own remaining battery level is high and there is no need to request proxy transmission (described in detail later), the image data and the like requested by the monitoring device 20 in question or another monitoring device 20 to the server 50 via the base station 1 and the like with the use of the long-range communication that consumes more electric power than the short-range communication. Further, the monitoring device 20 transmits, in a case where its own remaining battery level is low and there is a need to request the proxy transmission (described in detail later), the image data and the like to another monitoring device 20 with the use of the short-range communication that consumes less electric power than the long-range communication, to thereby request the proxy transmission to the server 50.

Figure 2:
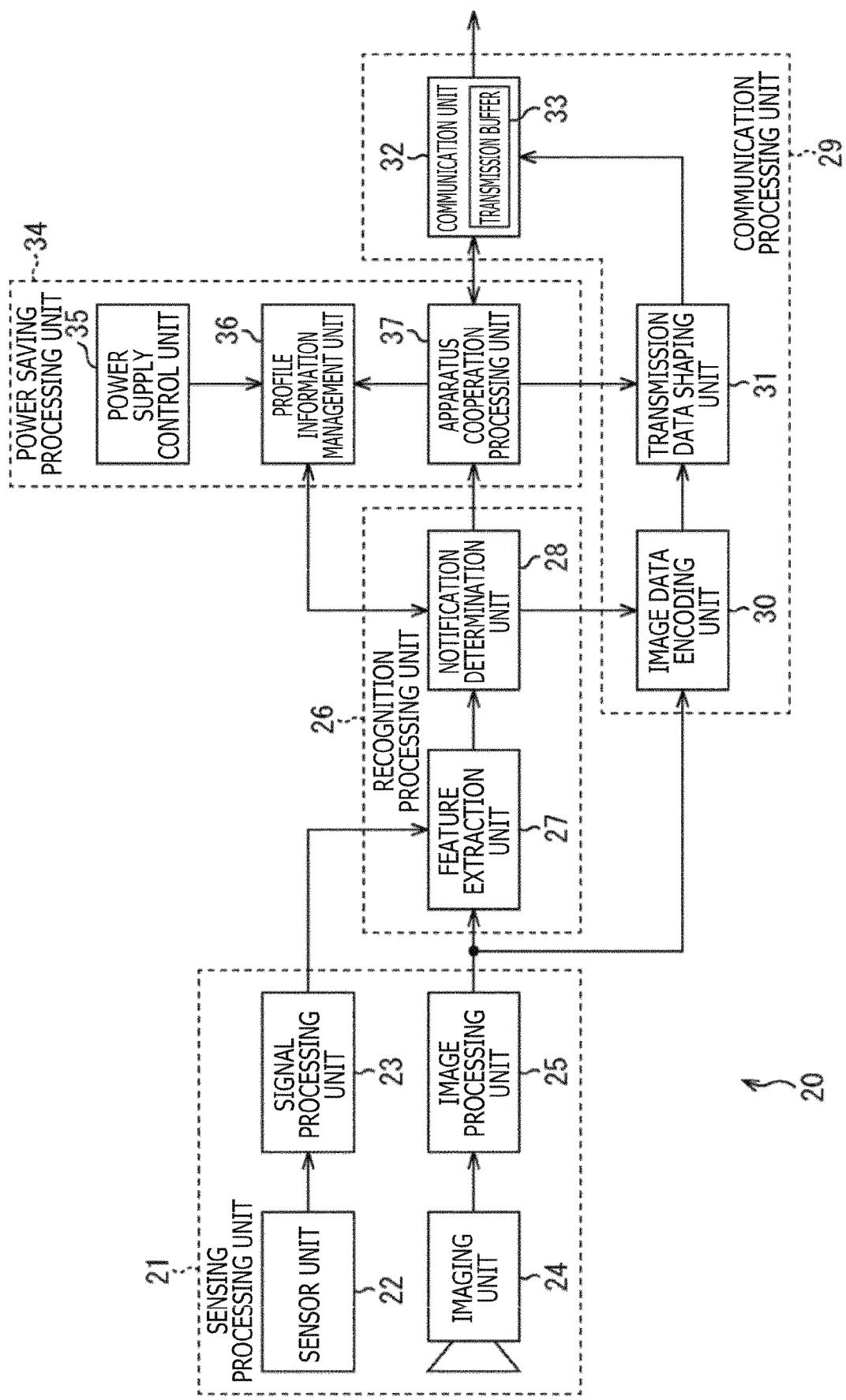
FIG. 2 is a block diagram illustrating a configuration example of an information transmission device to which the present technology is applied.

Next, FIG. 2 illustrates a configuration example of the monitoring device 20. The monitoring device 20 includes a sensing processing unit 21 configured to acquire the image data and various physical quantities, a recognition processing unit 26 configured to detect the specific event on the basis of the image data and the like, a communication processing unit 29 configured to communicate the image data and the profile information, and a power saving processing unit 34 configured to achieve power saving.

The sensing processing unit 21 includes a sensor unit 22, a signal processing unit 23, an imaging unit 24, and an image processing unit 25.

The sensor unit 22 includes various sensors configured to measure each of physical quantities such as sound, temperature, humidity, pressure, acceleration, magnetism, and a radiation dose, or emit electromagnetic waves, for example, to detect the state of an emission range on the basis of the reflected waves. The sensor unit 22 outputs sensor information that is a result of the measurement to the signal processing unit 23. The signal processing unit 23 executes, after performing AD conversion on the sensor information, signal processing such as noise removal or frequency analysis as preprocessing of recognition processing, and outputs the resultant to the recognition processing unit 26.

The imaging unit 24 includes a digital camera including an optical lens, an imaging element, and other components, and a light configured to emit visible light or invisible light such as IR. The imaging unit 24 takes an image in a predetermined monitoring range, and outputs image data obtained as the imaging result (video data or still image data taken at predetermined cycles) to the image processing unit 25. Note that, the imaging unit 24 can take images in the imaging range at different resolutions (for example, low resolution and high resolution). The image processing unit 25 executes, as preprocessing of the recognition processing, image processing such as demosaicing, grayscale correction, color tone correction, noise removal, distortion correction, or size correction on the image data from the imaging unit 24, and outputs the resultant to the recognition processing unit 26 and an image data encoding unit 30.

The recognition processing unit 26 includes a feature extraction unit 27 and a notification determination unit 28. The feature extraction unit 27 extracts, from the preprocessed sensor information or the preprocessed image data, features necessary for detecting the specific event (for example, intrusion of suspicious persons or suspicious objects or outbreak of fire), and outputs the features to the notification determination unit 28. The notification determination unit 28 determines, on the basis of a change in feature input from the previous stage, whether or not the specific event has occurred, and notifies the image data encoding unit 30, a profile information management unit 36, and an apparatus cooperation processing unit 37 of the determination result.

The communication processing unit 29 includes the image data encoding unit 30, a transmission data shaping unit 31, and a communication unit 32.

When being notified of the occurrence of the specific event from the notification determination unit 28, the image data encoding unit 30 captures the image data from the image processing unit 25 to encode the image data in accordance with a predetermined encoding method, and outputs the encoded image data obtained as a result of the encoding to the transmission data shaping unit 31. The transmission data shaping unit 31 adds metainformation such as information representing the detected specific event or detection time to the encoded image data, thereby shaping the transmission data, and outputs the transmission data to the communication unit 32.

The communication unit 32 includes a transmission buffer 33. The communication unit 32 stores the transmission data that is input from the transmission data shaping unit 31 in the transmission buffer 33, and then transmits the transmission data to another monitoring device 20 by the short-range communication or transmits the transmission data to the server 50 via the base station 1 and the like by the long-range communication. Further, in a case where the proxy transmission is performed, the communication unit 32 stores the transmission data that is input from another monitoring device 20 in the transmission buffer 33, and then transmits the transmission data to the server 50 via the base station 1 and the like by the long-range communication. Note that, the communication unit 32 may store the transmission data that is input from another monitoring device 20 in the transmission buffer 33, and then transmit the transmission data to still another monitoring device 20 by the short-range communication.

In addition, the communication unit 32 transmits the profile information that is supplied from the apparatus cooperation processing unit 37 to another monitoring device 20 by the short-range communication, and receives the profile information transmitted from another monitoring device 20 to supply the profile information from the apparatus cooperation processing unit 37.

The power saving processing unit 34 includes a power supply control unit 35, the profile information management unit 36, and the apparatus cooperation processing unit 37. The power supply control unit 35 controls charging of a battery, which is not illustrated, and monitors the battery to notify the profile information management unit 36 of the remaining level of the battery. The profile information management unit 36 manages and updates the profile information (described later) including items such as the remaining battery level, and supplies the profile information to the apparatus cooperation processing unit 37 in response to a request from the apparatus cooperation processing unit 37.

On the basis of the profile information that is supplied from the profile information management unit 36, the apparatus cooperation processing unit 37 controls cooperation processing with another monitoring device 20 that includes determining whether or not the monitoring device 20 needs to request the proxy transmission or determining whether or not the proxy transmission that is requested by another monitoring device 20 is available.

<Profile Information of Monitoring Device 20>

Next, FIG. 3 illustrates the items of the profile information that the profile information management unit 36 of each of the monitoring devices 20 manages.

The profile information includes the following items: a MAC address and an installation position classified as apparatus information, a detection interval and a time-period-based history classified as event information, a remaining battery level and a threshold classified as power supply information, and a transmission state and a transmission buffer state classified as communication information.

The MAC address is identification information for uniquely identifying the monitoring device 20. Another identification information may be used as long as the identification information can uniquely identify the monitoring device 20. The installation position is information representing a position at which the monitoring device 20 is installed. The detection interval is information representing the average of intervals at which the monitoring device 20 detects the specific event. The time-period-based history is information representing an event detection history based on predetermined time periods of the monitoring device 20.

The remaining battery level is information representing the remaining battery level of the monitoring device 20 as a percentage, for example. The threshold is a threshold for dividing the degree of the remaining battery level, and two thresholds are used in a case where the remaining battery level is divided into three, namely, high, medium, and low, for example. The transmission state is information representing whether data is being transmitted to the server 50 by the long-range notification. The transmission buffer state is information representing the number of pieces of transmission data stored in the transmission buffer 33.

Of the items of the profile information, the time-period-based history, the remaining battery level, the threshold, the transmission state, and the transmission buffer state are used for determining whether or not to perform the proxy transmission requested by another monitoring device 20.

Then, in a case where it is determined that the proxy transmission is available, of the items of the profile information, the MAC address, the installation position, the detection interval, and the remaining battery level are transmitted to a request source of the proxy transmission. Note that, all the items of the profile information may be transmitted to the request source of the proxy transmission.

<Relationship Between Remaining Battery Level and Proxy Transmission>

Figure 4:
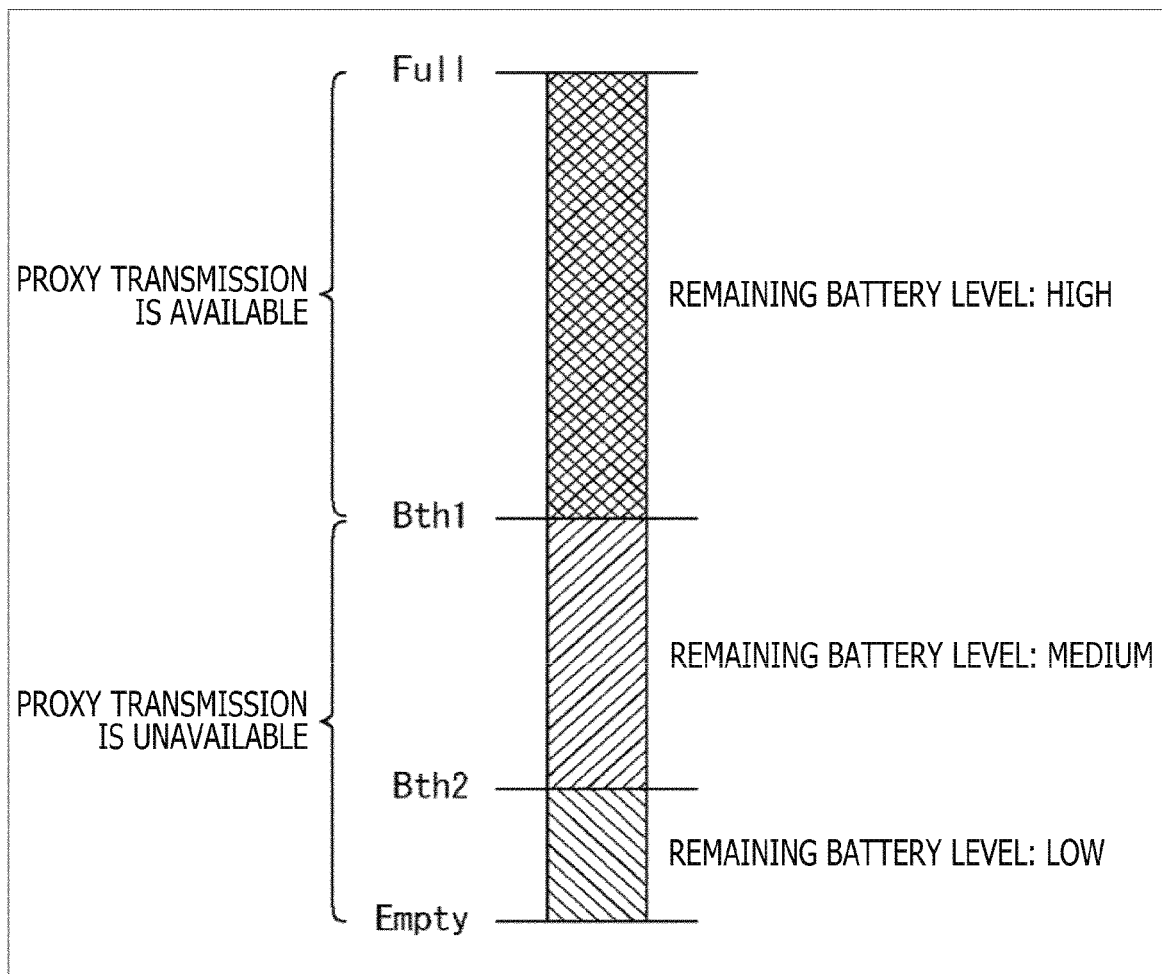
FIG. 4 is a diagram illustrating a relationship between a remaining battery level and proxy transmission.

FIG. 4 illustrates a relationship between the remaining battery level and the proxy transmission.

For example, in a case where the remaining battery level is divided into three, namely, high, medium, and low as illustrated in FIG. 4, two thresholds Bth1 and Bth2 are used. The remaining battery level is classified as high when the remaining battery level is the threshold Bth1 or higher. The remaining battery level is classified as medium when the remaining battery level is the threshold Bth2 or higher and lower than the threshold Bth1. The remaining battery level is classified as low when the remaining battery level is Empty or higher and lower than the threshold Bth2.

In the case where the remaining battery level is classified as high, basically, the monitoring device 20 does not request the proxy transmission and transmits the transmission data itself to the server 50 by the long-range communication. The monitoring device 20, however, requests the proxy transmission by the short-range communication without performing the long-range communication itself in a case where one of the following conditions is satisfied: the number of pieces of transmission data stored in the transmission buffer 33 exceeds a predetermined value, a situation where the detection interval of the specific event is short is continued, and the specific event is detected a predetermined number of times. Further, in a case where the proxy transmission is requested by another monitoring device 20, the monitoring device 20 determines that the proxy transmission is available, and sends a reply indicating that the proxy transmission is available.

In the case where the remaining battery level is classified as medium, basically, the monitoring device 20 requests the proxy transmission from another monitoring device 20 by the short-range communication. Note that, if there is no another monitoring device 20 capable of performing the proxy transmission, the monitoring device 20 in question transmits the transmission data to the server 50 by the long-range communication or accumulates the transmission data in the transmission buffer 32. In the case where the proxy transmission is requested by another monitoring device 20, the monitoring device 20 determines that the proxy transmission is unavailable, and sends a reply indicating that the proxy transmission is unavailable.

In the case where the remaining battery level is classified as low, the monitoring device 20 does not request the proxy transmission and accumulates the transmission data in the transmission buffer 32. In the case where the proxy transmission is requested by another monitoring device 20, the monitoring device 20 determines that the proxy transmission is unavailable. At this time, the reply indicating that the proxy transmission is unavailable is not sent. When the monitoring device 20 has electric power enough to perform the short-range communication, however, the monitoring device 20 may send the reply indicating that the proxy transmission is unavailable.

<First Monitoring Processing by Monitoring Device 20>

Figure 5:
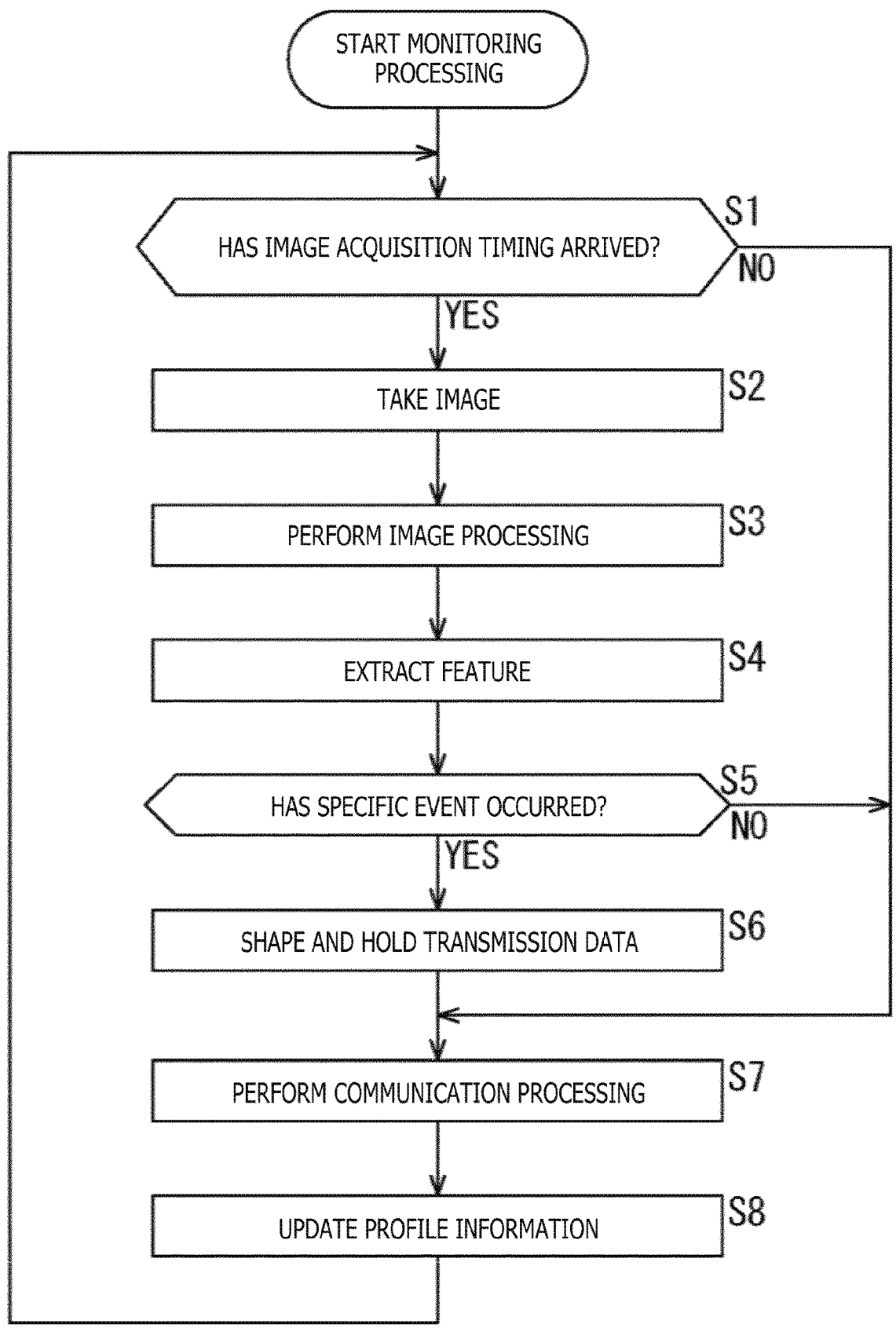
FIG. 5 is a flowchart illustrating first monitoring processing by the information transmission device.

Next, FIG. 5 is a flowchart illustrating first monitoring processing by the monitoring device 20.

This first monitoring processing is continually executed by each of the monitoring devices 20 of the monitoring system 10.

In Step S1, it is determined whether or not image acquisition timing has arrived. Note that, the image acquisition timing is determined in advance to arrive every ten seconds, for example, and a user can set and change the image acquisition timing to any value. In a case where it is determined that the image acquisition timing has arrived, the processing proceeds to Step S2.

In Step S2, the imaging unit 24 takes the image in the imaging range and outputs the image data obtained as a result of the imaging to the image processing unit 25. At this time, visible light or invisible light may be emitted depending on brightness in the imaging range.

In Step S3, the image processing unit 25 executes, as preprocessing, the image processing on the image data from the previous stage, and outputs the resultant to the recognition processing unit 26 and the image data encoding unit 30. In Step S4, the feature extraction unit 27 of the recognition processing unit 26 extracts, from the preprocessed image data, features necessary for detecting the specific event, and outputs the features to the notification determination unit 28. In Step S5, the notification determination unit 28 determines whether or not the specific event has occurred on the basis of a change in feature input from the feature extraction unit 27.

In a case where it is determined that the specific event has occurred in Step S5, the processing proceeds to Step S6. In Step S6, the notification determination unit 28 notifies the image data encoding unit 30, the profile information management unit 36, and the apparatus cooperation processing unit 37 that it is determined that the specific event has occurred. The image data encoding unit 30 encodes the image data from the image processing unit 25 and outputs the encoded image data obtained as a result of the encoding to the transmission data shaping unit 31. The transmission data shaping unit 31 adds the metainformation to the encoded image data to shape the transmission data, and outputs the transmission data to the communication unit 32. The communication unit 32 stores, in the transmission buffer 33, the transmission data input from the transmission data shaping unit 31.

In Step S7, the apparatus cooperation processing unit 37 and the communication processing unit 29 perform communication processing. The details of this communication processing are described with reference to FIG. 6.

<Details of Communication Processing>

Figure 6:
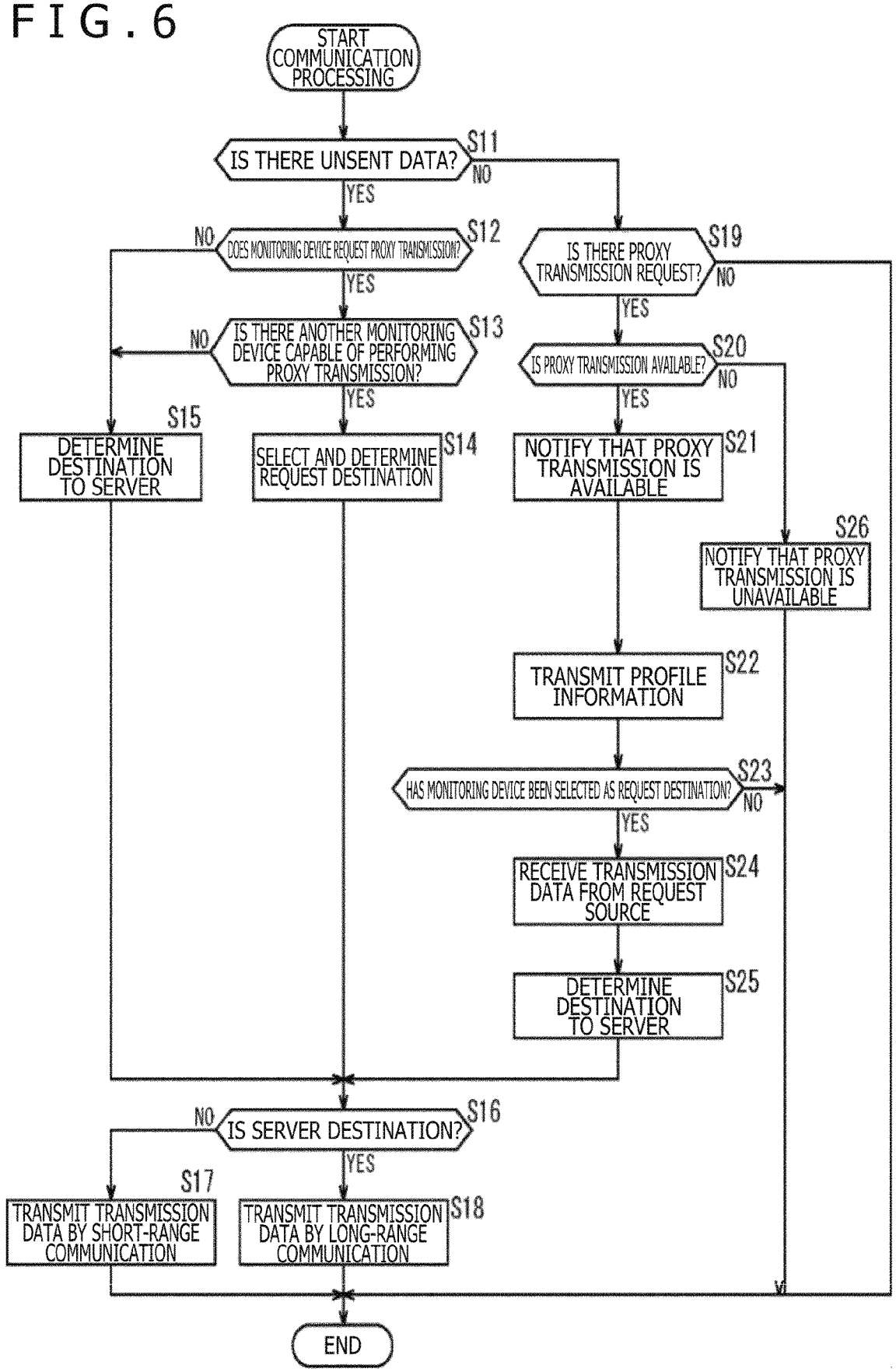
FIG. 6 is a flowchart illustrating the details of communication processing.

FIG. 6 is a flowchart illustrating the details of the communication processing in Step S7 described above.

In Step S11, the apparatus cooperation processing unit 37 determines whether or not the communication unit 32 has the transmission data stored in the transmission buffer 33 (unsent transmission data). In a case where it is determined that there is the stored transmission data, the processing proceeds to Step S12. In Step S12, the apparatus cooperation processing unit 37 determines, on the basis of the remaining battery level recorded on the profile information, whether or not to request the proxy transmission from another monitoring device 20. Here, as described above with reference to FIG. 4, the remaining battery level included in the profile information is classified as any one of high, medium, and low through comparison between the remaining battery level and the threshold, and the determination is made on the basis of a result of the classification.

In a case where it is determined to request the proxy transmission in Step S12, the apparatus cooperation processing unit 37 requests the proxy transmission from other monitoring devices 20 of the monitoring system 10 by the short-range communication. From the other monitoring devices 20 that have received this request, replies indicating whether or not the proxy transmission is available are sent (no reply is sent in some cases), and hence after the apparatus cooperation processing unit 37 waits the replies from the other monitoring devices 20 for a predetermined period of time, the processing proceeds to Step S13.

In Step S13, the apparatus cooperation processing unit 37 determines, on the basis of the replies from the other monitoring devices 20, whether or not there is another monitoring device 20 capable of performing the proxy transmission. In a case where it is determined that there is another monitoring device 20 capable of performing the proxy transmission, the processing proceeds to Step S14.

In Step S14, the apparatus cooperation processing unit 37 requests, via the communication unit 32, the profile information (at least including the MAC address, the installation position, and the remaining battery level) from the other monitoring devices 20 capable of performing the proxy transmission. The apparatus cooperation processing unit 37 selects, from the other monitoring devices 20 capable of performing the proxy transmission, the other monitoring device 20 having the remaining battery level classified as high and being closest to the monitoring device 20 in question as a request destination of the proxy transmission on the basis of the profile information transmitted from the other monitoring devices 20 in response to this request, and determines, as a destination of the transmission data, the monitoring device 20 that is the request destination of the proxy transmission. In accordance with the control by the apparatus cooperation processing unit 37, the communication unit 32 notifies, by the short-range communication, the other monitoring device 20 that is the request destination of the proxy transmission that the other monitoring device 20 in question has been selected as the request destination of the proxy transmission. Further, in accordance with the control by the apparatus cooperation processing unit 37, the communication unit 32 notifies, by the short-range communication, the other monitoring devices 20 other than the one that is the request destination of the proxy transmission that the monitoring devices 20 have not been selected as the request destination of the proxy transmission. Note that, the latter notification may be omitted. After that, the processing proceeds to Step S16.

Note that, in a case where it is determined not to request the proxy transmission in Step S12 or in a case where it is determined that there is no another monitoring device 20 capable of performing the proxy transmission in Step S13, the processing proceeds to Step S15. In Step S15, the apparatus cooperation processing unit 37 determines the server 50 as the destination of the transmission data. After that, the processing proceeds to Step S16.

In Step S16, the apparatus cooperation processing unit 37 determines whether or not the destination of the transmission data is the server 50 (another monitoring device 20). In a case where it is determined that the destination of the transmission data is not the server 50, that is, is another monitoring device 20, the processing proceeds to Step S17. In Step S17, in accordance with the control by the apparatus cooperation processing unit 37, the communication unit 32 transmits, by the short-range communication, the transmission data stored in the transmission buffer 33 to the other monitoring device 20 selected as the request destination of the proxy transmission (in a case where the remaining battery level is classified as low, however, the transmission data is not transmitted). Through the above-mentioned processes, the communication processing ends.

Further, in a case where it is determined that the destination of the transmission data is the server 50 in Step S16, the processing proceeds to Step S18. In Step S18, in accordance with the control by the apparatus cooperation processing unit 37, the communication unit 32 transmits, by the long-range communication, the transmission data stored in the transmission buffer 33 to the server 50 via the base station 1 and the like. Through the above-mentioned processes, the communication processing ends.

In a case where it is determined that no transmission data is stored in the transmission buffer 33 in Step S11, on the other hand, the processing proceeds to Step S19. In Step S19, the apparatus cooperation processing unit 37 determines whether or not the communication unit 32 has received a proxy transmission request from another monitoring device 20. In a case where it is determined that there is the proxy transmission request, the processing proceeds to Step S20. In Step S20, the apparatus cooperation processing unit 37 determines, on the basis of the remaining battery level recorded on the profile information, whether or not the proxy transmission is available. Here, as described above with reference to FIG. 4, the remaining battery level included in the profile information is classified as any one of high, medium, and low through comparison between the remaining battery level and the threshold, and the determination is made on the basis of the result of the classification.

In a case where it is determined that the proxy transmission is available in Step S20, the processing proceeds to Step S21. In Step S21, in accordance with the control by the apparatus cooperation processing unit 37, the communication unit 32 notifies, by the short-range communication, another monitoring device 20 that is the request source of the proxy transmission that the proxy transmission is available. In addition, in Step S22, the communication unit 32 transmits the MAC address, the installation position, the detection interval, and the remaining battery level of the items of the profile information. Note that, all the items of the profile information may be transmitted to the request source of the proxy transmission.

In Step S23, the apparatus cooperation processing unit 37 checks whether or not the communication unit 32 has been notified from the request source of the proxy transmission that the monitoring device 20 has been selected as the request destination of the proxy transmission, thereby determining whether or not the monitoring device 20 has been selected as the request destination of the proxy transmission. In a case where it is determined that the monitoring device 20 has been selected as the request destination of the proxy transmission, the processing proceeds to Step S24.

In Step S24, the communication unit 32 receives the transmission data transmitted from another monitoring device 20 that is the request source of the proxy transmission, and stores the transmission data in the transmission buffer 33. In Step S15, the apparatus cooperation processing unit 37, namely, the apparatus cooperation processing unit 37 determines the server 50 as the destination of the transmission data stored in the transmission buffer 33. After that, the processing proceeds to Step S16.

Note that, in a case where it is determined that there is no proxy transmission request from another monitoring device 20 in Step S19, the communication processing ends at this stage.

Further, in a case where it is determined that the proxy transmission is unavailable in Step S20, the processing proceeds to Step S26. In Step S26, in accordance with the control by the apparatus cooperation processing unit 37, the communication unit 32 notifies, by the short-range communication, the other monitoring device 20 that is the request source of the proxy transmission that the proxy transmission is unavailable. In a case where the remaining battery level is classified as low, however, the notification indicating that the proxy transmission is unavailable is not made. Through the above-mentioned processes, the communication processing ends.

Referring back to FIG. 5, in Step S8, the profile information management unit 36 updates the profile information. After that, the processing returns to Step S1, and Step S1 and the subsequent steps are repeated.

Note that, in a case where it is determined that the image acquisition timing has not arrived in Step S1, Steps S2 to S6 are skipped and the processing proceeds to Step S7. Further, in a case where it is determined that the specific event has not occurred in Step S5, Step S5 is skipped and the processing proceeds to Step S7.

That concludes the description of the first monitoring processing by each of the monitoring devices 20 of the monitoring system 10.

With each of the monitoring devices 20 of the monitoring system 10 executing the first monitoring processing described above, the power consumption of the entire monitoring system 10 can be smoothed, and the non-uniformity of the remaining battery levels between the monitoring devices 20 can be reduced. It is therefore possible to reduce the cost necessary for the maintenance management of the monitoring system 10 and extend the operating time of the entire monitoring system 10.

<Specific Operation Example of Monitoring Device 20 of Monitoring System 10>

Now, a specific operation example of the monitoring device 20 of the monitoring system 10 is described.

Figure 7:
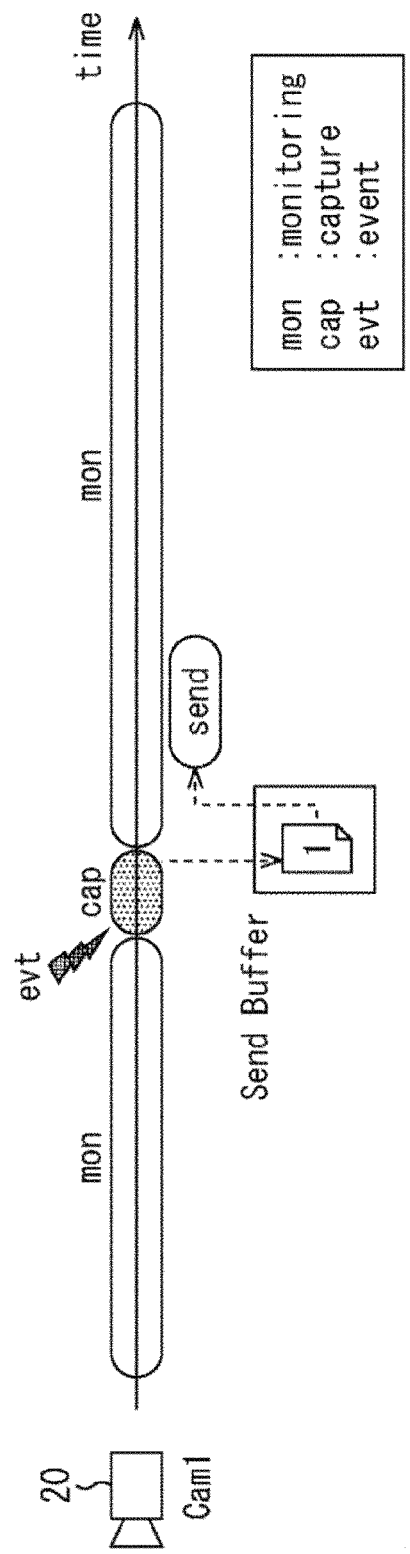
FIG. 7 is a diagram illustrating an operation example in a case where a specific event is sporadically detected and proxy transmission is not requested.

FIG. 7 illustrates an operation example in a case where the specific event is sporadically detected and the monitoring device 20 does not request the proxy transmission.

As illustrated in FIG. 7, when the specific event is detected during monitoring, the image data is captured in response to the detection to be encoded and shaped. The image data, which is now the transmission data, is stored in the transmission buffer 33, and is then transmitted to the server 50 by the long-range communication. Note that, in the case of FIG. 7, after the specific event is detected, the operation is changed from monitoring to the transmission of the transmission data to be executed, but both the operations may be executed in a time-divided manner depending on the remaining battery level.

Figure 8:
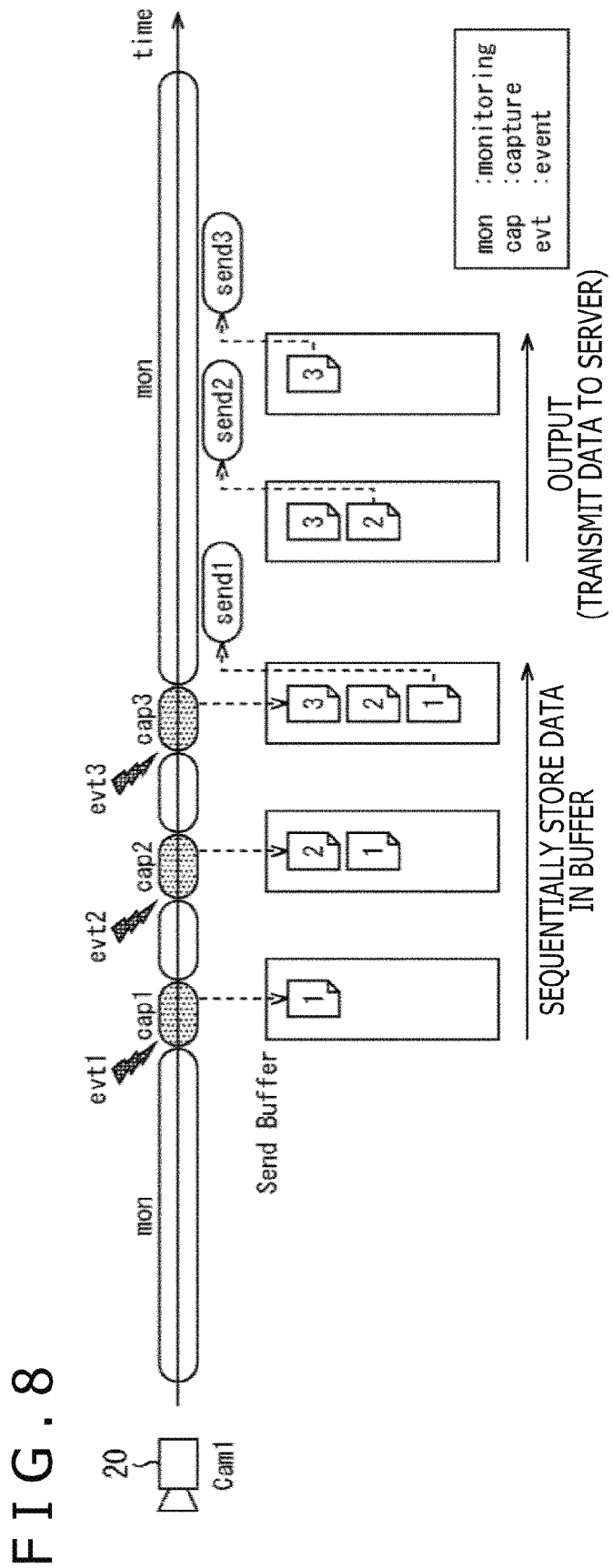
FIG. 8 is a diagram illustrating an operation example in a case where the specific event is continuously detected and the proxy transmission is not requested.

FIG. 8 illustrates an operation example in a case where the specific event is continuously detected and the monitoring device 20 does not request the proxy transmission.

As illustrated in FIG. 8, when the specific event is continuously detected during monitoring, the image data is captured in response to each detection to be encoded and shaped. The image data, which is now the transmission data, is stored in the transmission buffer 33. Then, after a certain period of time has elapsed since the specific event is detected last time, the pieces of transmission data stored in the transmission buffer 33 are sequentially transmitted to the server 50 by the long-range communication in the order of being stored.

Figure 9:
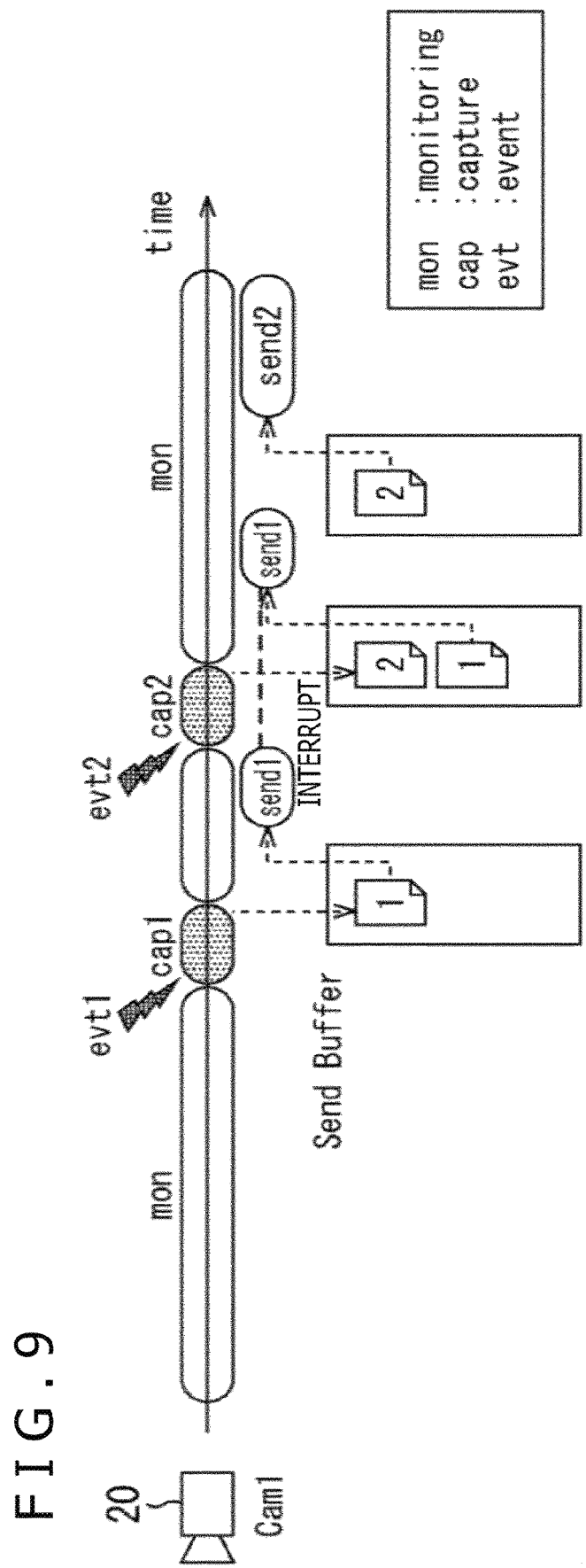
FIG. 9 is a diagram illustrating an operation example in a case where the specific event is detected during transmission of transmission data.

FIG. 9 illustrates an operation example in a case where the specific event is detected during the transmission of the transmission data.

As illustrated in FIG. 9, when the specific event is detected during monitoring that is executed in parallel to the transmission of the transmission data, the transmission of the transmission data is interrupted. Then, the image data is captured in response to the detection of the specific event to be encoded and shaped. The image data, which is now the transmission data, is stored in the transmission buffer 33. The transmission of the transmission data that has been interrupted is resumed, and the pieces of transmission data are transmitted to the server 50 by the long-range communication in the order of being stored. Note that, in a case where the remaining battery level is sufficient, the image data may be captured in parallel to the transmission of the transmission data without interruption of the transmission.

Figure 11:
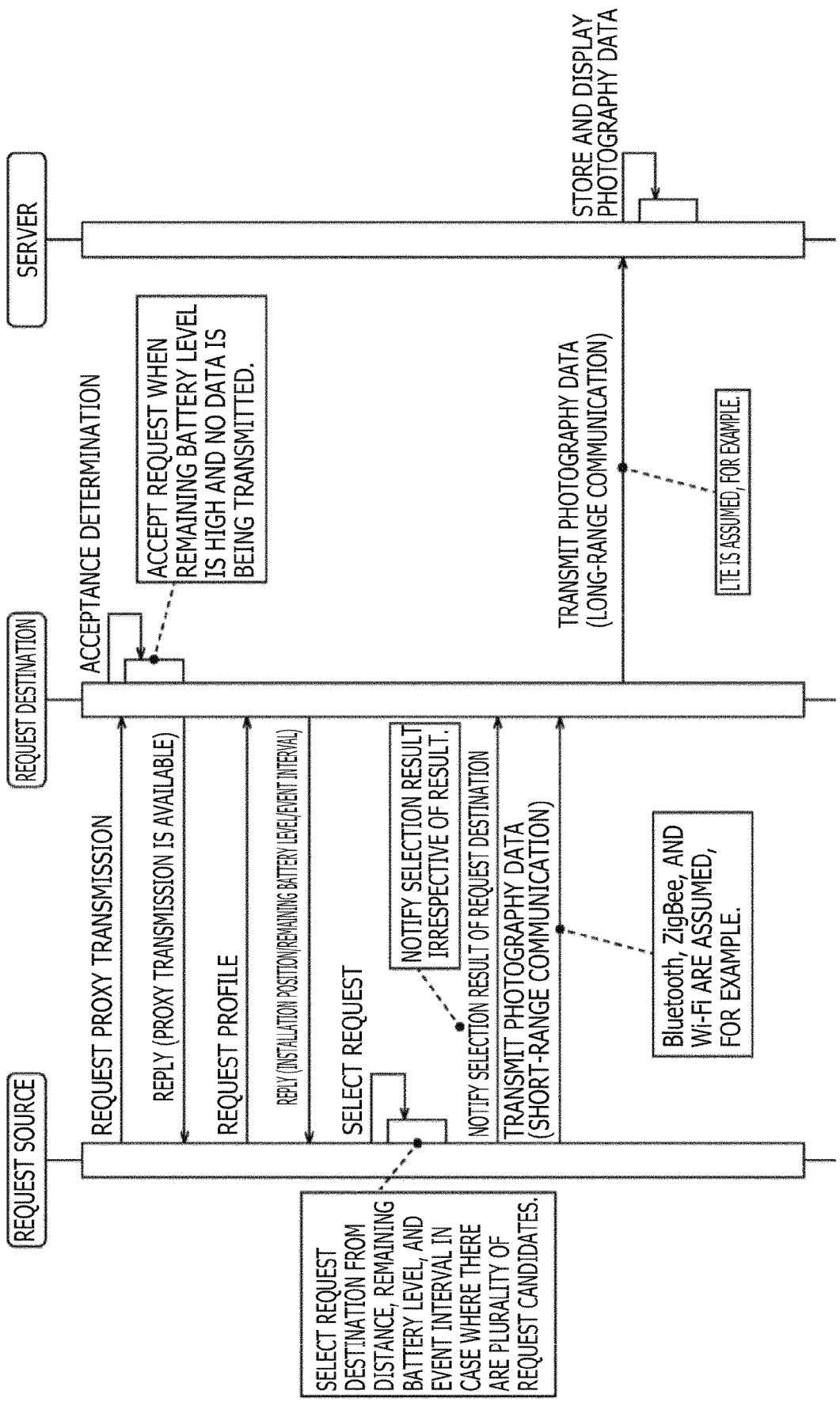
FIG. 11 is a diagram illustrating an example of the operation sequence of a request source and the request destination of the proxy transmission, which corresponds to FIGS. 10A, 10B, 10C, 10D, 10E, and 10F.

FIGS. 10A, 10B, 10C, 10D, 10E, and 10F illustrate a first operation example in a case where the request destination of the proxy transmission is selected. FIG. 11 illustrates the operation sequence of the monitoring device 20 that is the request source of the proxy transmission and another monitoring device 20 that is to serve as the request destination, which corresponds to FIGS. 10A, 10B, 10C, 10D, 10E, and 10F.

As illustrated in FIG. 10A, when the monitoring device 20 that is the request source of the proxy transmission (Cam1 in FIGS. 10A, 10B, 10C, 10D, 10E, and 10F) requests the proxy transmission from other monitoring devices 20 (Cam2 to Cam4 in FIGS. 10A, 10B, 10C, 10D, 10E, and 10F), the other monitoring devices 20 (Cam2 to Cam4) send replies indicating whether or not the proxy transmission is available as illustrated in FIG. 10B. In a case where two other monitoring devices 20 (Cam2 and Cam3) of the monitoring devices reply that the proxy transmission is available, the monitoring device 20 requests the profile information (at least including the MAC address, the installation position, and the remaining battery level) from the other monitoring devices 20 capable of performing the proxy transmission (Cam2 and Cam3) as illustrated in FIG. 10C.

In the monitoring device 20 that is the request source of the proxy transmission (Cam1), as illustrated in FIG. 10D, the apparatus cooperation processing unit 37 selects, from the other monitoring devices 20 capable of performing the proxy transmission, the monitoring device 20 having the remaining battery level classified as high and the installation position closest to the monitoring device 20 in question (in this case, Cam3) as the request destination of the proxy transmission on the basis of the profile information transmitted from the other monitoring devices 20 capable of performing the proxy transmission (Cam2 and Cam3). Then, the apparatus cooperation processing unit 37 notifies the other monitoring device 20 that is the request destination (Cam3) of the selected monitoring device.

Next, the monitoring device 20 that is the request source of the proxy transmission (Cam1) transmits the transmission data to the other monitoring device 20 that is the request destination (Cam3) by the short-range communication as illustrated in FIG. 10E. The other monitoring device 20 (Cam3) that is the request destination and has received the transmission data transmits the received transmission data to the server 50 via the base station 1 and the like by the long-range communication as illustrated in FIG. 10F.

Next, FIGS. 12A, 12B, 12C, 12D, 12E, and 12F illustrate a second operation example in the case where the request destination of the proxy transmission is selected.

The second operation example is different from the first operation example in that the monitoring device 20 requests the profile information (at least including the MAC address, the installation position, the detection interval, and the remaining battery level) from the other monitoring devices 20 capable of performing the proxy transmission (Cam2 and Cam3), and selects, from the other monitoring devices 20 capable of performing the proxy transmission, the monitoring device 20 having the remaining battery level classified as high, a long detection interval of the specific event, and the installation position closest to the monitoring device 20 in question (in this case, Cam3) as the request destination of the proxy transmission. The remaining operation is similar to that of the first operation example, and hence description thereof is omitted.

Figure 13:
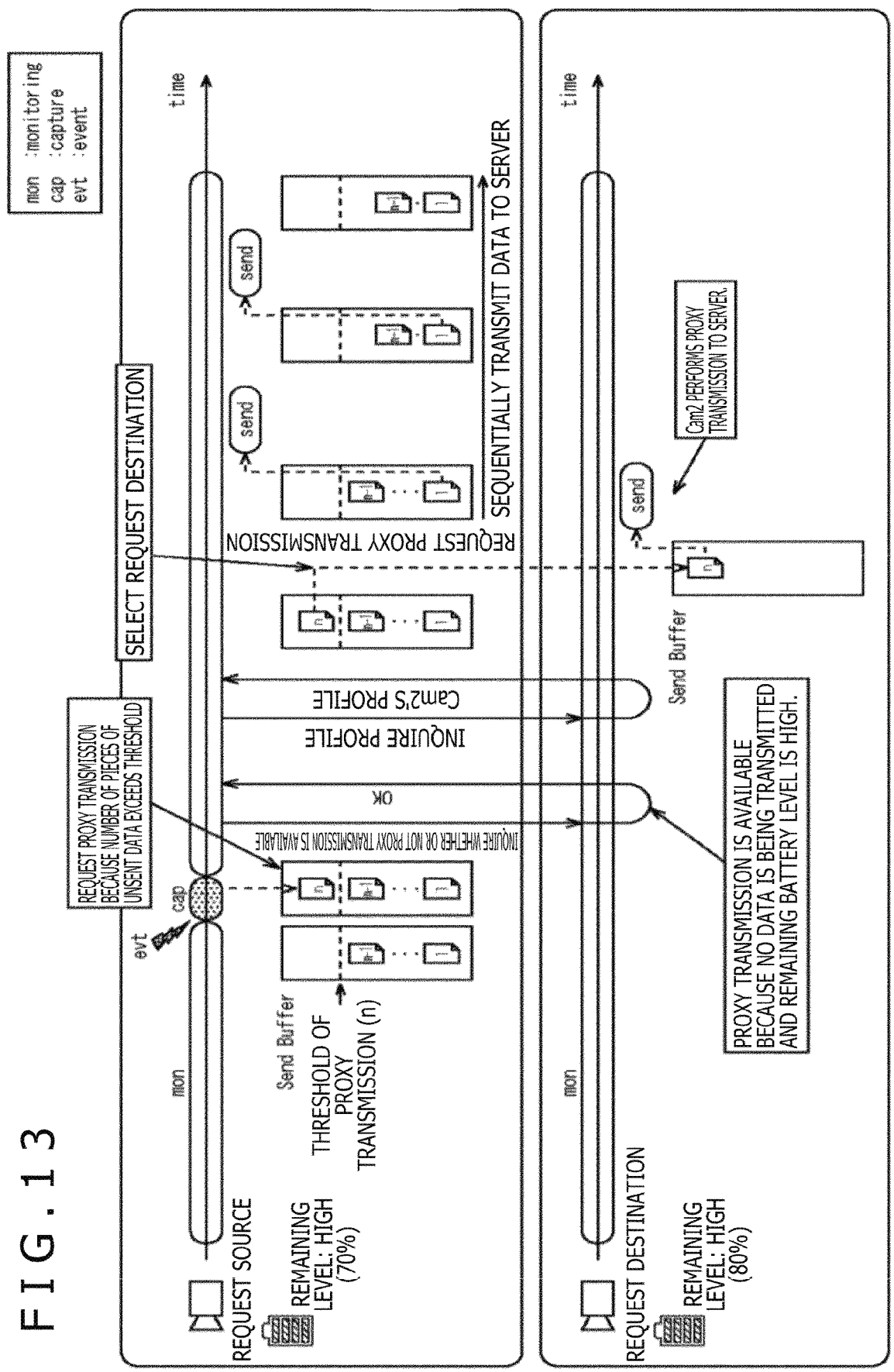
FIG. 13 is a diagram illustrating an example of the operation sequence of the request source and the request destination of the proxy transmission.

Next, FIG. 13 illustrates an example of the operation sequence of the monitoring device 20 that is the request source of the proxy transmission and another monitoring device 20 that is to serve as the request destination.

In the example of FIG. 13, there is illustrated a case where the monitoring device 20 (request source) that has had the remaining battery level classified as high and thus has not requested the proxy transmission requests the proxy transmission from another monitoring device 20 (request destination) because the number of pieces of transmission data stored in the transmission buffer 33 exceeds the predetermined value.

Figure 14:
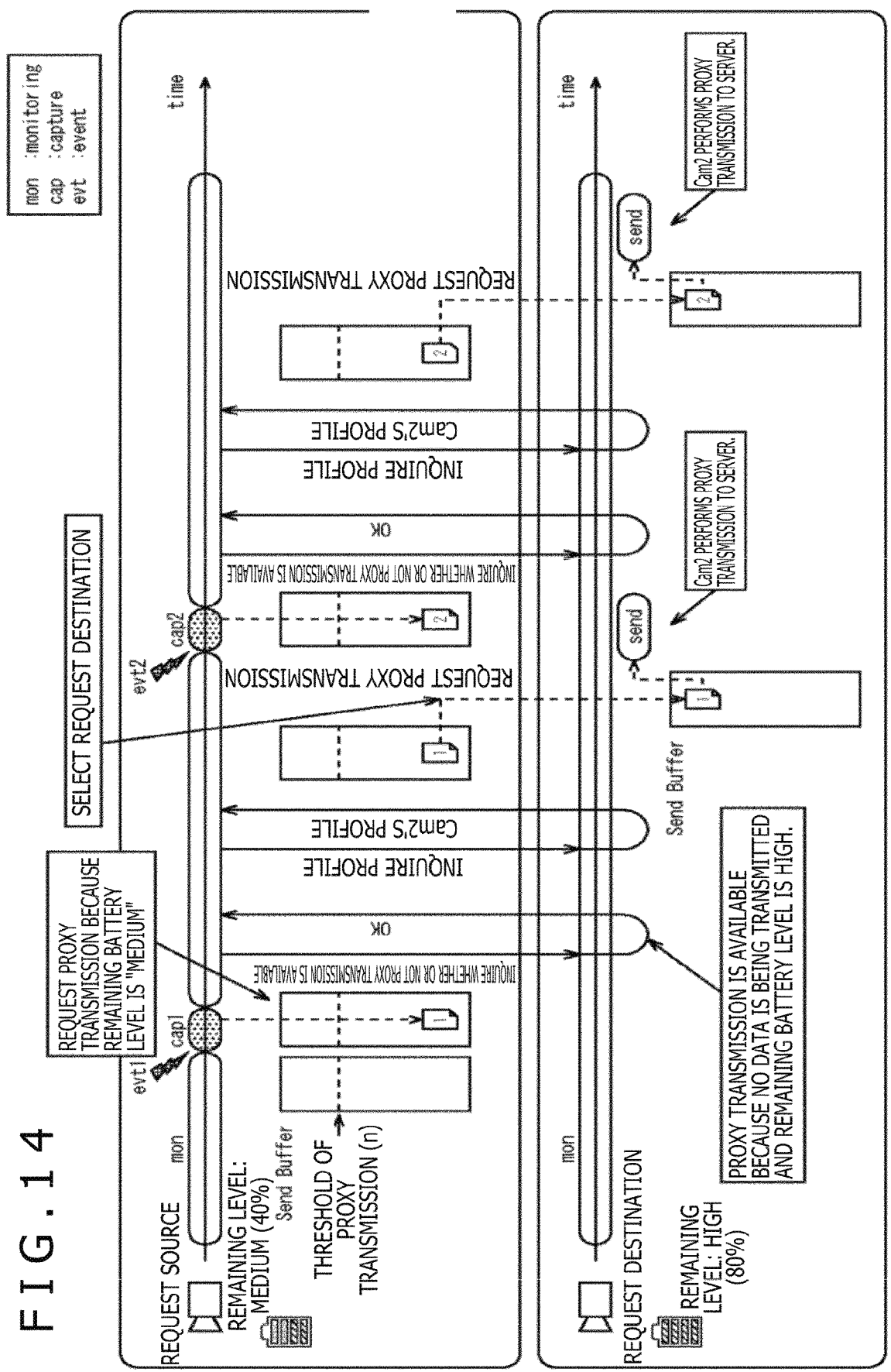
FIG. 14 is a diagram illustrating another example of the operation sequence of the request source and the request destination of the proxy transmission.

FIG. 14 illustrates another example of the operation sequence of the monitoring device 20 that is the request source of the proxy transmission and another monitoring device 20 that is to serve as the request destination.

In the example of FIG. 14, there is illustrated a case where the monitoring device 20 (request source) having the remaining battery level classified as medium requests the proxy transmission from another monitoring device 20 (request destination) every time the monitoring device 20 detects the specific event, and can select the request destination for each request.

Figure 15:
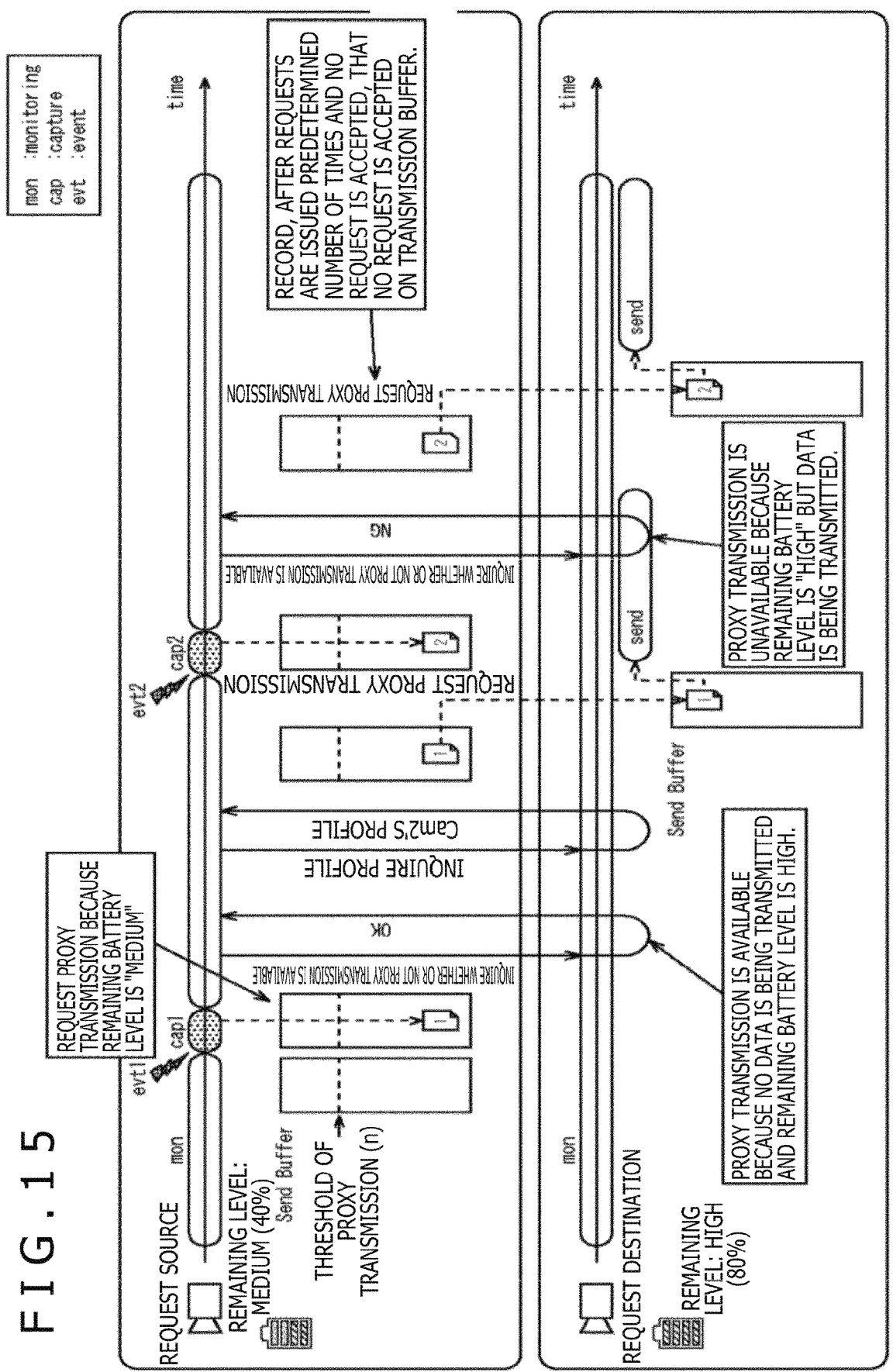
FIG. 15 is a diagram illustrating another example of the operation sequence of the request source and the request destination of the proxy transmission.

FIG. 15 illustrates still another example of the operation sequence of the monitoring device 20 that is the request source of the proxy transmission and another monitoring device 20 that is to serve as the request destination.

In the example of FIG. 15, there is illustrated a case where the monitoring device 20 (request source) having the remaining battery level classified as medium requests the proxy transmission from another monitoring device 20 (request destination) every time the monitoring device 20 detects the specific event, and cannot select the request destination because there is no another monitoring device 20 capable of performing the proxy transmission. In this case, proxy transmission requests are issued a predetermined number of times. When the request source can select the request destination as a result of issuing the requests the predetermined number of times, the request source requests the proxy transmission from the request destination. When the request source cannot select the request destination as a result of issuing the requests the predetermined number of times, the request source holds the transmission data in the transmission buffer 33.

<Second Monitoring Processing by Monitoring Device 20>

Next, second monitoring processing that is a modified example of the first monitoring processing described above is described.

Figure 16:
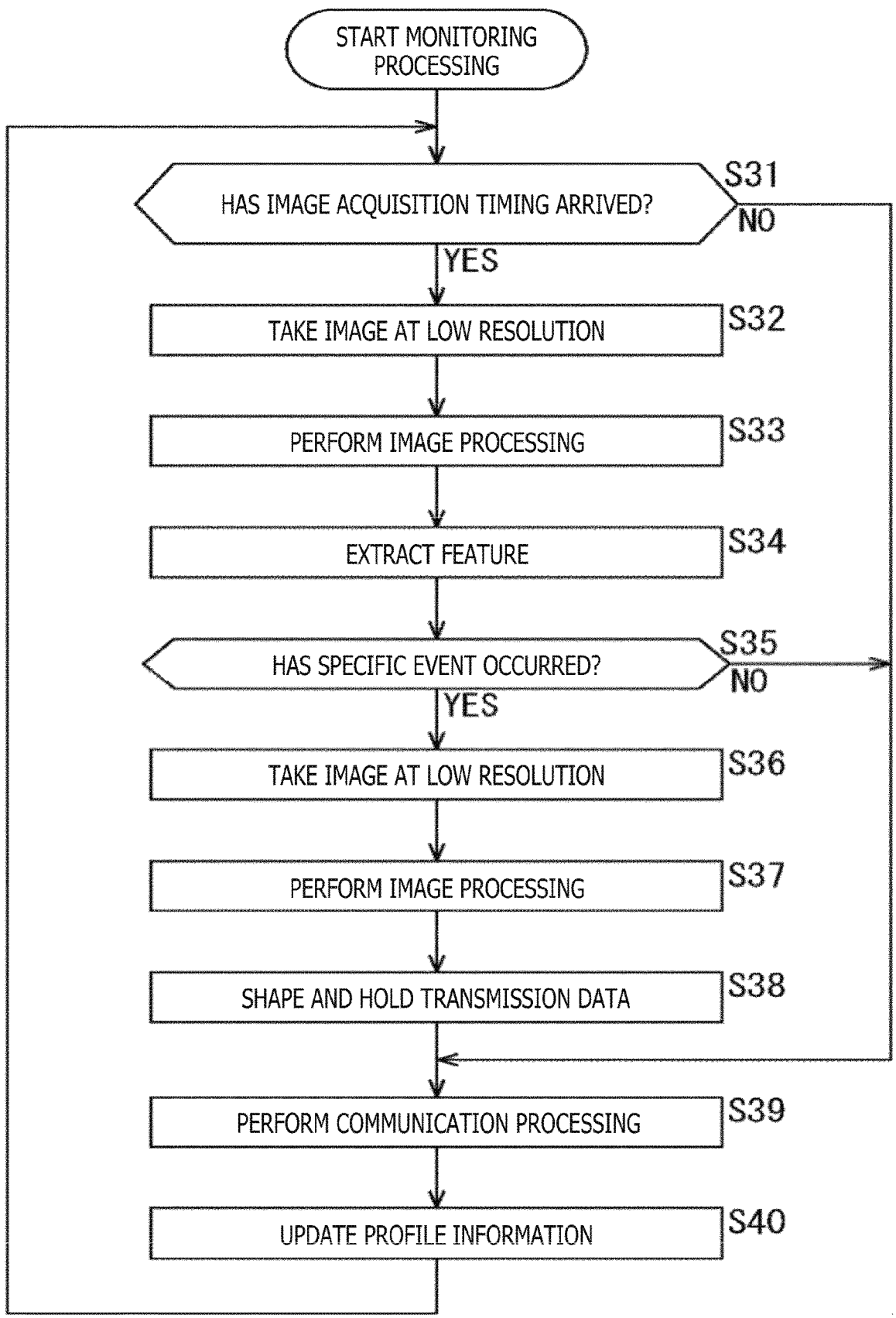
FIG. 16 is a flowchart illustrating second monitoring processing by the information transmission device.

FIG. 16 is a flowchart illustrating the second monitoring processing by the monitoring device 20.

This second monitoring processing is continually executed by each of the monitoring devices 20 of the monitoring system 10.

In Step S31, it is determined whether or not the image acquisition timing has arrived. Note that, the image acquisition timing is determined in advance to arrive every ten seconds, for example, and the user can set and change the image acquisition timing to any value. In a case where it is determined that the image acquisition timing has arrived, the processing proceeds to Step S32.

In Step S32, the imaging unit 24 takes the image in the imaging range at low resolution and outputs the low-resolution image data obtained as a result of the imaging to the image processing unit 25. At this time, visible light or invisible light may be emitted depending on brightness in the imaging range.

In Step S33, the image processing unit 25 executes, as preprocessing, the image processing on the low-resolution image data from the previous stage, and outputs the resultant to the recognition processing unit 26. In Step S34, the feature extraction unit 27 of the recognition processing unit 26 extracts, from the preprocessed low-resolution image data, features necessary for detecting the specific event, and outputs the features to the notification determination unit 28. In Step S35, the notification determination unit 28 determines whether or not the specific event has occurred on the basis of a change in feature input from the feature extraction unit 27.

In a case where it is determined that the specific event has occurred in Step S35, the processing proceeds to Step S36. In Step S36, the notification determination unit 28 notifies the sensing processing unit 21, the image data encoding unit 30, the profile information management unit 36, and the apparatus cooperation processing unit 37 that it is determined that the specific event has occurred. The imaging unit 24 of the sensing processing unit 21 takes the image in the imaging range at high resolution in response to this notification, and outputs the high-resolution image data obtained as a result of the imaging to the image processing unit 25. At this time, visible light or invisible light may be emitted depending on brightness in the imaging range.

In Step S37, the image processing unit 25 executes, as preprocessing, the image processing on the high-resolution image data from the previous stage, and outputs the resultant to the image data encoding unit 30. In Step S38, the image data encoding unit 30 encodes the high-resolution image data from the image processing unit 25, and outputs the encoded image data obtained as a result of the encoding to the transmission data shaping unit 31. The transmission data shaping unit 31 adds the metainformation to the encoded image data to shape the transmission data, and outputs the transmission data to the communication unit 32. The communication unit 32 stores, in the transmission buffer 33, the transmission data input from the transmission data shaping unit 31.

In Step S39, the apparatus cooperation processing unit 37 and the communication processing unit 29 perform the communication processing. This communication processing is similar to the one described above with reference to FIG. 6, and hence description thereof is omitted.

In Step S40, the profile information management unit 36 updates the profile information. After that, the processing returns to Step S31, and Step S31 and the subsequent steps are repeated.

Note that, in a case where it is determined that the image acquisition timing has not arrived in Step S31, Steps S32 to S38 are skipped, and the processing proceeds to Step S39. Further, in a case where it is determined that the specific event has not occurred in Step S35, Steps S36 to S38 are skipped, and the processing proceeds to Step S39.

That concludes the description of the second monitoring processing by each of the monitoring devices 20 of the monitoring system 10.

With each of the monitoring devices 20 of the monitoring system 10 executing the second monitoring processing described above, an effect similar to that provided by the first monitoring processing can be obtained. Further, the image is taken at low resolution until the specific event is detected, and hence power consumption necessary for imaging can be reduced compared to the first monitoring processing in which the image is taken at high resolution from the beginning.

<Third Monitoring Processing by Monitoring Device 20>

Next, third monitoring processing that is another modified example of the first monitoring processing described above is described.

Figure 17:
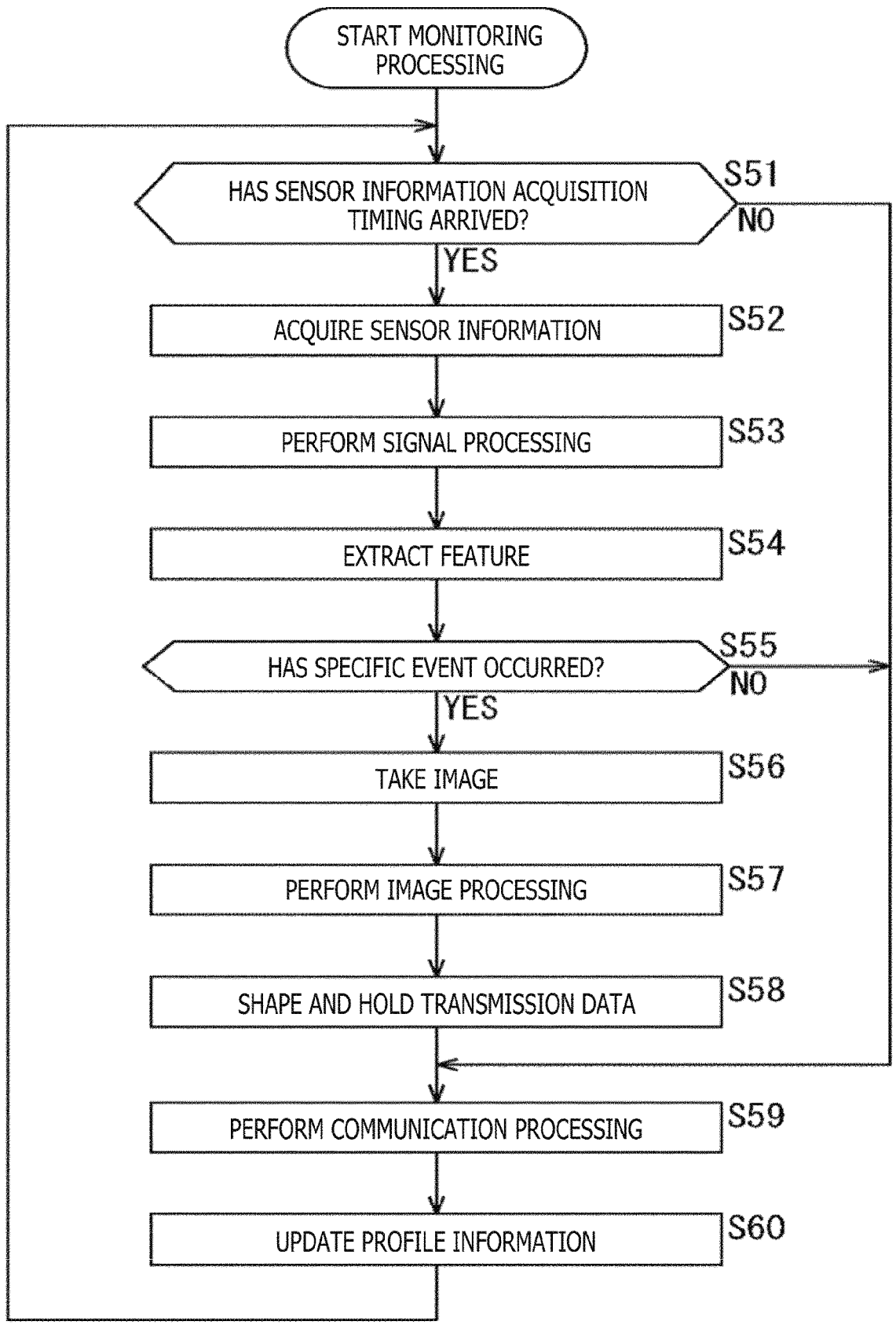
FIG. 17 is a flowchart illustrating third monitoring processing by the information transmission device.

FIG. 17 is a flowchart illustrating the third monitoring processing by the monitoring device 20.

This third monitoring processing is continually executed by each of the monitoring devices 20 of the monitoring system 10.

In Step S51, it is determined whether or not timing of sensor information acquisition by the sensor unit 22 has arrived. Note that, the sensor information acquisition timing is determined in advance to arrive every ten seconds, for example, and the user can set and change the sensor information acquisition timing to any value. In a case where it is determined that the sensor information acquisition timing has arrived, the processing proceeds to Step S52.

In Step S52, the sensor unit 22 acquires the sensor information and outputs the sensor information to the signal processing unit 23.

In Step S53, the signal processing unit 23 executes, as preprocessing, signal processing on the sensor information from the previous stage, and outputs the resultant to the recognition processing unit 26. In Step S54, the feature extraction unit 27 of the recognition processing unit 26 extracts, from the preprocessed sensor information, features necessary for detecting the specific event, and outputs the features to the notification determination unit 28. In Step S55, the notification determination unit 28 determines, on the basis of a change in feature input from the feature extraction unit 27, whether or not the specific event has occurred.

In a case where it is determined that the specific event has occurred in Step S55, the processing proceeds to Step S56. In Step S56, the notification determination unit 28 notifies the sensing processing unit 21, the image data encoding unit 30, the profile information management unit 36, and the apparatus cooperation processing unit 37 that it is determined that the specific event has occurred. The imaging unit 24 of the sensing processing unit 21 takes the image in the imaging range in response to this notification, and outputs the (high-resolution) image data obtained as a result of the imaging to the image processing unit 25. At this time, visible light or invisible light may be emitted depending on brightness in the imaging range.

In Step S57, the image processing unit 25 executes, as preprocessing, the image processing on the image data from the previous stage, and outputs the resultant to the image data encoding unit 30. In Step S58, the image data encoding unit 30 encodes the image data from the image processing unit 25, and outputs the encoded image data obtained as a result of the encoding to the transmission data shaping unit 31. The transmission data shaping unit 31 adds the metainformation to the encoded image data to shape the transmission data, and outputs the transmission data to the communication unit 32. The communication unit 32 stores, in the transmission buffer 33, the transmission data input from the transmission data shaping unit 31.

In Step S59, the apparatus cooperation processing unit 37 and the communication processing unit 29 perform the communication processing. This communication processing is similar to the one described above with reference to FIG. 6, and hence description thereof is omitted.

In Step S60, the profile information management unit 36 updates the profile information. After that, the processing returns to Step S51, and Step S51 and the subsequent steps are repeated.

Note that, in a case where it is determined that the sensor information acquisition timing has not arrived in Step S51, Steps S52 to S58 are skipped, and the processing proceeds to Step S59. Further, in a case where it is determined that the specific event has not occurred in Step S55, Steps S56 to S58 are skipped, and the processing proceeds to Step S59.

That concludes the description of the third monitoring processing by each of the monitoring devices 20 of the monitoring system 10.

With each of the monitoring devices 20 of the monitoring system 10 executing the third monitoring processing described above, an effect similar to that provided by the first monitoring processing can be obtained.

<Fourth Monitoring Processing by Monitoring Device 20>

Next, fourth monitoring processing that is still another modified example of the first monitoring processing described above is described.

Figure 18:
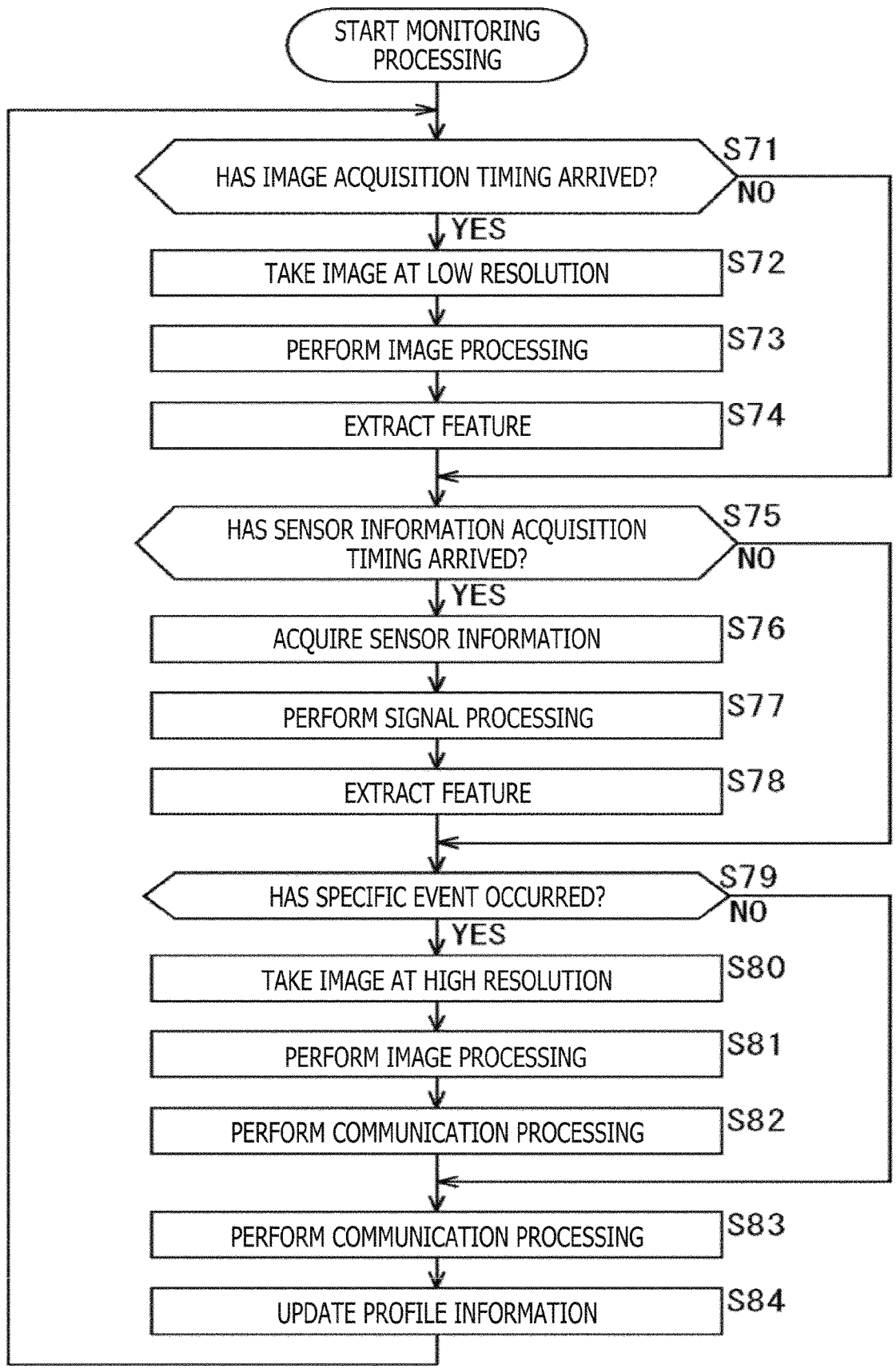
FIG. 18 is a flowchart illustrating fourth monitoring processing by the information transmission device.

FIG. 18 is a flowchart illustrating the fourth monitoring processing by the monitoring device 20.

This fourth monitoring processing is continually executed by each of the monitoring devices 20 of the monitoring system 10.

In Step S71, it is determined whether or not the image acquisition timing has arrived. Note that, the image acquisition timing is determined in advance to arrive every ten seconds, for example, and the user can set and change the image acquisition timing to any value. In a case where it is determined that the image acquisition timing has arrived, the processing proceeds to Step S72.

In Step S72, the imaging unit 24 takes the image in the imaging range at low resolution and outputs the low-resolution image data obtained as a result of the imaging to the image processing unit 25. At this time, visible light or invisible light may be emitted depending on brightness in the imaging range.

In Step S73, the image processing unit 25 executes, as preprocessing, the image processing on the low-resolution image data from the previous stage, and outputs the resultant to the recognition processing unit 26. In Step S74, the feature extraction unit 27 of the recognition processing unit 26 extracts, from the preprocessed low-resolution image data, features necessary for detecting the specific event, and outputs the features to the notification determination unit 28.

In Step S75, it is determined whether or not the timing of the sensor information acquisition by the sensor unit 22 has arrived. Note that, the sensor information acquisition timing is determined in advance to arrive every ten seconds, for example, and the user can set and change the sensor information acquisition timing to any value. In a case where it is determined that the sensor information acquisition timing has arrived, the processing proceeds to Step S76.

In Step S76, the sensor unit 22 acquires the sensor information and outputs the sensor information to the signal processing unit 23.

In Step S77, the signal processing unit 23 executes, as preprocessing, the signal processing on the sensor information from the previous stage, and outputs the resultant to the recognition processing unit 26. In Step S78, the feature extraction unit 27 of the recognition processing unit 26 extracts, from the preprocessed sensor information, features necessary for detecting the specific event, and outputs the features to the notification determination unit 28.

In Step S79, the notification determination unit 28 determines whether or not the specific event has occurred on the basis of a change in feature from the low-resolution image data and a change in feature from the sensor information input from the feature extraction unit 27.

In a case where it is determined that the specific event has occurred, the processing proceeds to Step S80. In Step S80, the notification determination unit 28 notifies the sensing processing unit 21, the image data encoding unit 30, the profile information management unit 36, and the apparatus cooperation processing unit 37 that it is determined that the specific event has occurred. The imaging unit 24 of the sensing processing unit 21 takes the image in the imaging range at high resolution in response to this notification, and outputs the high-resolution image data obtained as a result of the imaging to the image processing unit 25. At this time, visible light or invisible light may be emitted depending on brightness in the imaging range.

In Step S81, the image processing unit 25 executes, as preprocessing, the image processing on the high-resolution image data from the previous stage, and outputs the resultant to the image data encoding unit 30. In Step S82, the image data encoding unit 30 encodes the high-resolution image data from the image processing unit 25, and outputs the encoded image data obtained as a result of the encoding to the transmission data shaping unit 31. The transmission data shaping unit 31 adds the metainformation to the encoded image data to shape the transmission data, and outputs the transmission data to the communication unit 32. The communication unit 32 stores, in the transmission buffer 33, the transmission data input from the transmission data shaping unit 31.

In Step S83, the apparatus cooperation processing unit 37 and the communication processing unit 29 perform the communication processing. This communication processing is similar to the one described above with reference to FIG. 6, and hence description thereof is omitted.

In Step S84, the profile information management unit 36 updates the profile information. After that, the processing returns to Step S71, and Step S71 and the subsequent steps are repeated.

Note that, in a case where it is determined that the image data acquisition timing has not arrived in Step S71, Steps S72 to S74 are skipped, and the processing proceeds to Step S75. Further, in a case where it is determined that the sensor information acquisition timing has not arrived in Step S75, Steps S76 to S78 are skipped, and the processing proceeds to Step S79. In addition, in a case where it is determined that the specific event has not occurred in Step S79, Steps S80 to S82 are skipped, and the processing proceeds to Step S83.

That concludes the description of the fourth monitoring processing by each of the monitoring devices 20 of the monitoring system 10.

With each of the monitoring devices 20 of the monitoring system 10 executing the fourth monitoring processing described above, an effect similar to that provided by the first monitoring processing can be obtained. Further, the specific event can be detected more accurately on the basis of the image data and the sensor information.

<Application Example of Monitoring System 10>

Next, FIGS. 19A, 19B, 19C, 19D, 19E, and 19F illustrate application examples of the monitoring system 10 in various fields.

Figure 19:
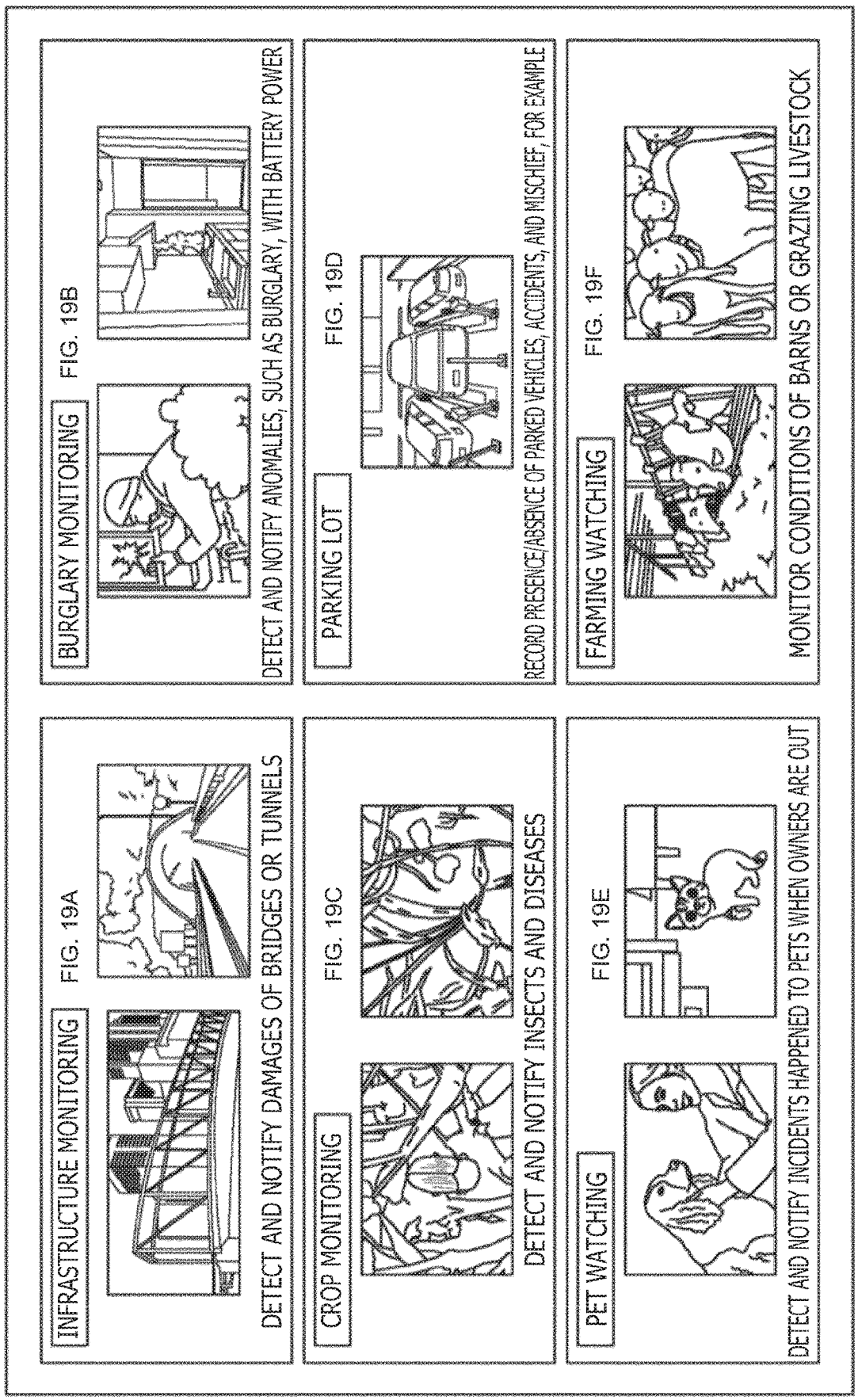
FIGS. 19A, 19B, 19C, 19D, 19E, and 19F are diagrams illustrating application examples of a monitoring system.

As illustrated in FIG. 19A, the monitoring system 10 can be used for detecting and notifying specific events (for example, accidents, troubles, or disasters) in public infrastructures such as bridges, tunnels, roads, railroads, power transmission facilities, water supply and sewerage systems, harbors, dams, or communication facilities.

Further, as illustrated in FIG. 19B, the monitoring system 10 can be used for detecting and notifying specific events (for example, intrusion of suspicious persons or fire) in places where no one is present such as empty houses. As a matter of course, the monitoring system 10 can be used for monitoring in places where people are present.

Further, as illustrated in FIG. 19C, the monitoring system 10 can be used for detecting and notifying specific events (for example, pest damage or diseases) of crops.

Further, as illustrated in FIG. 19D, the monitoring system 10 can be used for detecting and notifying specific events (for example, presence/absence of parked vehicles, hit-and-run accidents, or mischief) in parking lots, for example.

Further, the monitoring system 10 can be used for watching the states of pets in homes, for example, as illustrated in FIG. 19E.

Further, the monitoring system 10 can be used for monitoring livestock in barns, for example, as illustrated in FIG. 19F.

<Modified Example of Monitoring System 10>

In the above description, each of the monitoring devices 20 of the monitoring system 10 finally transmits the image data to the server 50. As a modified example, the monitoring device 20 may finally transmit the sensor information acquired by the sensor unit 22 to the server 50 instead of the image data or in addition to the image data.

In the above description, another monitoring device 20 that has been requested the proxy transmission by the monitoring device 20 that is the request source determines whether or not the proxy transmission is available on the basis of its own remaining battery level, and sends the reply. As a modified example, each of the monitoring devices 20 may manage its own specific event detection history, and determine, even when the monitoring device 20 does not receive the proxy transmission request, whether or not the proxy transmission is available on the basis of its own specific event detection history, to thereby notify another monitoring device 20 of the determination result.

Figure 20:
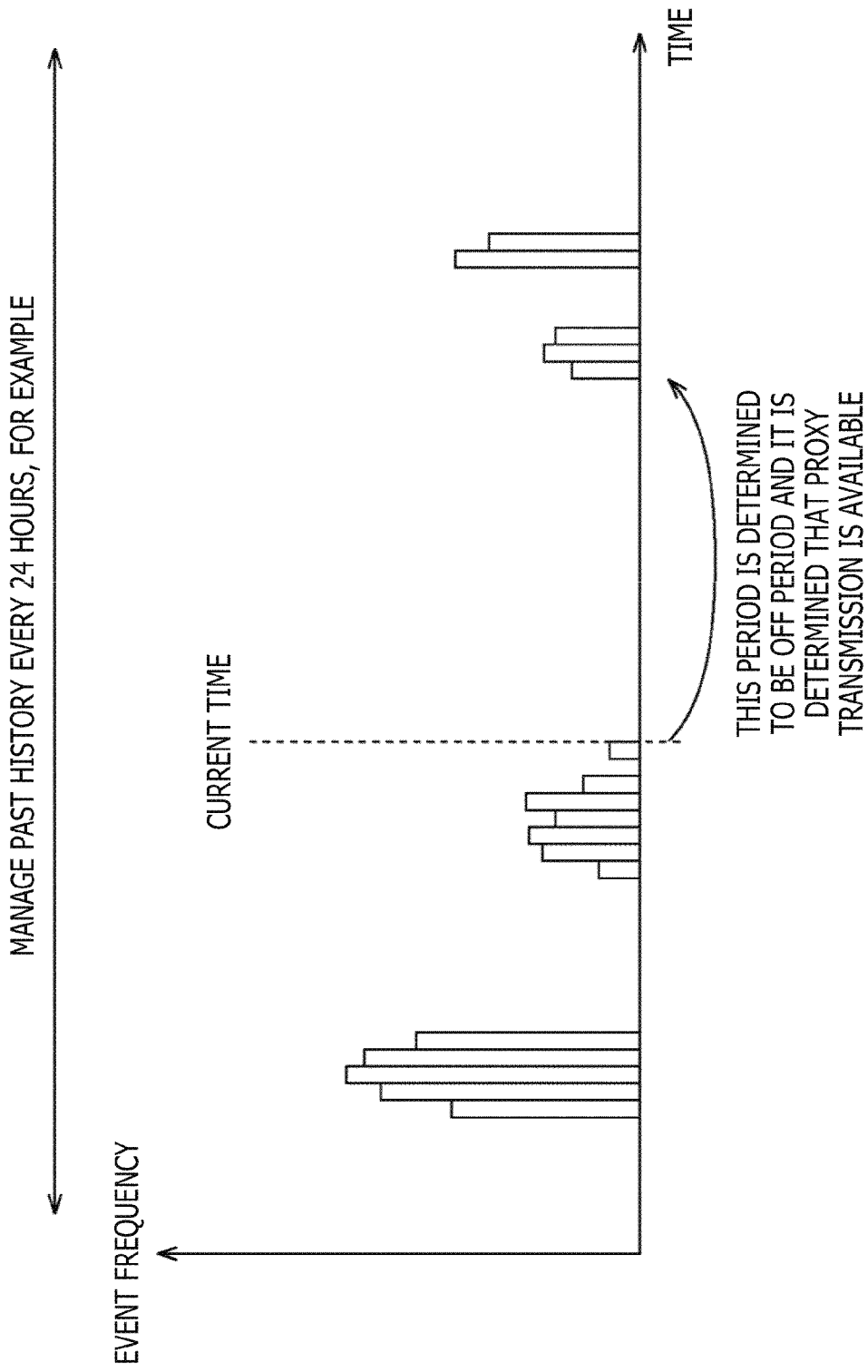
FIG. 20 is a diagram illustrating an example of a specific event detection history.

For example, each of the monitoring devices 20 may refer to the specific event detection history in a predetermined period (one day, one week, or one month, for example), and notify another monitoring device 20 that the proxy transmission is available in a case where it is predicted that an off period may arrive after current time as illustrated in FIG. 20.

Note that, in a case where the most recent interval at which the specific event is notified is largely deviated from the long-term specific event detection history, it is only necessary to determine that the prediction accuracy is low and notify that the proxy transmission is unavailable.

In the above description, the monitoring device 20 that is the request source of the proxy transmission selects the request destination from other monitoring devices 20 capable of performing the proxy transmission. As a modified example, each of the monitoring devices 20 may regularly transmit its own profile information to the server 50, and the server 50 may determine whether or not each of the monitoring devices 20 needs the proxy transmission and select the request destination of the proxy transmission.

In the above description, the monitoring device 20 having a low remaining battery level requests the proxy transmission of the transmission data from another monitoring device 20. As a modified example, the monitoring device 20 having a low remaining battery level may request imaging from another neighboring monitoring device 20 whose imaging range is overlapped with that of the monitoring device 20 in question.

In the above description, the monitoring device 20 that is the request source of the proxy transmission transmits the transmission data by the short-range communication, and one another monitoring device 20 that is the request destination transmits the transmission data in question to the server 50 via the base station 1 and the like by the long-range communication. As a modified example, other monitoring devices 20 may relay, by the short-range communication, the transmission data from the monitoring device 20 that is the request source of the proxy transmission, and one of the other monitoring devices 20 may finally transmit the transmission data to the server 50 via the base station 1 and the like by the long-range communication.

Note that, the modified examples described above can be combined with each other as appropriate.

The embodiment of the present technology is not limited to the embodiment described above, and various modifications can be made within the scope of the gist of the present technology.

The present technology can employ the following configurations.

(1)

An information transmission device, including:

an acquisition unit configured to acquire surrounding information;

a detection unit configured to detect occurrence of a specific event based on the surrounding information acquired;

a generation unit configured to generate transmission data from the surrounding information when the occurrence of the specific event is detected;

a management unit configured to manage profile information at least including a remaining battery level;

a decision unit configured to decide, based on the profile information, a destination of the transmission data generated; and a transmission unit configured to transmit the transmission data to the destination decided.

(2)

The information transmission device according to Item (1), in which the decision unit decides, based on the profile information, whether or not to request proxy transmission, decides another information transmission device as the destination of the transmission data in a case where the decision unit determines to request the proxy transmission, and decides a server as the destination of the transmission data in a case where the decision unit decides not to request the proxy transmission, and the transmission unit transmits, in a case where another information transmission device is decided as the destination of the transmission data, the transmission data to the other information transmission device by short-range communication, and transmits, in a case where the server is decided as the destination of the transmission data, the transmission data to the server by long-range communication.

(3)

The information transmission device according to Item (2), further including:

a holding unit configured to hold the transmission data that has not been transmitted by the transmission unit yet, in which the decision unit decides, based on the number of pieces of the transmission data held by the holding unit, whether or not to request the proxy transmission.

(4)

The information transmission device according to Item (2) or (3), in which in the case where the decision unit decides to request the proxy transmission, the decision unit requests the proxy transmission from other information transmission devices each of which is a target of the short-range communication, and selects another information transmission device that is to serve as a request destination of the proxy transmission from other information transmission devices that have sent a reply indicating that the proxy transmission is available in response to the request.

(5)

The information transmission device according to any one of Items (2) to (4), in which in the case where the decision unit decides to request the proxy transmission, the decision unit requests the proxy transmission from other information transmission devices each of which is the target of the short-range communication, and selects, from other information transmission devices that have sent the reply indicating that the proxy transmission is available in response to the request, another information transmission device that is to serve as the request destination of the proxy transmission based on the profile information of the other information transmission devices.

(6)

The information transmission device according to any one of Items (2) to (5), further including:

a determination unit configured to determine, in a case where the information transmission device receives a request of the proxy transmission from another information transmission device, whether or not the proxy transmission requested is available based on the profile information of the information transmission device.

(7)

The information transmission device according to Item (6), in which in a case where the determination unit determines that the proxy transmission is available and the information transmission device is selected as a request destination by a request source of the proxy transmission, the transmission unit transmits the transmission data transmitted from the request source by the short-range communication to the server by the long-range communication.

(8)

The information transmission device according to any one of Items (1) to (7), in which the profile information includes, in addition to the remaining battery level, at least one of identification information, position information, a detection interval of the specific event, a time-period-based history, a threshold of the remaining battery level, a transmission state, or transmission buffer information.

(9)

The information transmission device according to any one of Items (1) to (8), in which the acquisition unit includes an imaging unit configured to acquire image data as the surrounding information.

(10)

The information transmission device according to any one of Items (1) to (9), in which the acquisition unit includes a sensor unit configured to measure, as the surrounding information, at least one of sound, temperature, humidity, pressure, acceleration, magnetism, or a radiation dose.

(11)

An information transmission method for an information transmission device including an acquisition unit configured to acquire surrounding information, the information transmission method including the following steps that are executed by the information transmission device:

a detection step of detecting occurrence of a specific event based on the surrounding information acquired;

a generation step of generating transmission data from the surrounding information when the occurrence of the specific event is detected;

a decision step of deciding, based on profile information at least including a remaining battery level, a destination of the transmission data generated; and a transmission step of transmitting the transmission data to the destination decided.

(12)

An information transmission system, including:

a plurality of information transmission devices capable of performing short-range communication, in which each of the plurality of information transmission devices includes an acquisition unit configured to acquire surrounding information, a detection unit configured to detect occurrence of a specific event based on the surrounding information acquired, a generation unit configured to generate transmission data from the surrounding information when the occurrence of the specific event is detected, a management unit configured to manage profile information at least including a remaining battery level, a decision unit configured to decide, based on the profile information, whether or not to request proxy transmission, and decide another information transmission device as a destination of the transmission data in a case where the decision unit decides to request the proxy transmission and decide a server as the destination of the transmission data in a case where the decision unit decides not to request the proxy transmission, and a transmission unit configured to transmit the transmission data to the destination decided, an information transmission device that is to serve as a request source of the proxy transmission transmits the transmission data to an information transmission device that is to serve as a request destination of the proxy transmission by short-range communication, and the information transmission device that is to serve as the request destination of the proxy transmission transmits the transmission data transmitted from the information transmission device that is to serve as the request source of the proxy transmission to the server by long-range communication.

REFERENCE SIGNS LIST

10 Monitoring system, 20 Monitoring device, 21 Sensing processing unit, 22 Sensor unit, 23 Signal processing unit, 24 Imaging unit, 25 Image processing unit, 26 Recognition processing unit, 27 Feature extraction unit, 28 Notification determination unit, 29 Communication processing unit, 30 Image data encoding unit, 31 Transmission data shaping unit, 32 Communication unit, 33 Transmission buffer, 34 Power saving processing unit, 35 Power supply control unit, 36 Profile information management unit, 37 Apparatus cooperation processing unit

The invention claimed is:

1. A first information transmission device, comprising:
an acquisition unit configured to acquire surrounding information;
a detection unit configured to detect occurrence of a specific event based on the acquired surrounding information;
a generation unit configured to generate transmission data from the acquired surrounding information based on the detection of the occurrence of the specific event;
a management unit configured to manage profile information at least including a remaining battery level;
a decision unit configured to:
decide, based on the profile information, a destination of the generated transmission data;
decide, based on the profile information, to request proxy transmission;
decide a second information transmission device as the destination of the generated transmission data based on a decision to request the proxy transmission; and
decide a server as the destination of the generated transmission data based on a decision not to request the proxy transmission; and
a transmission unit configured to:
transmit the transmission data to the decided destination;
transmit the transmission data to the second information transmission device by a short-range communication based on the decision of the second information transmission device as the destination of the transmission data; and
transmit the transmission data to the server by a long-range communication based on the decision of the server as the destination of the transmission data.

2. The first information transmission device according to claim 1, further comprising
a holding unit configured to hold the transmission data that has not been transmitted by the transmission unit yet, wherein
the decision unit is further configured to decide, based on a number of pieces of the transmission data held by the holding unit, to request the proxy transmission.

3. The first information transmission device according to claim 1, wherein
based on the decision to request the proxy transmission, the decision unit is further configured to:
request the proxy transmission from a plurality of second information transmission devices each of which is a target of the short-range communication; and
select the second information transmission device from the plurality of second information transmission devices that have sent a reply indicating that the proxy transmission is available, wherein
the reply is sent based on the request, and
the second information transmission device is a request destination of the proxy transmission.

4. The first information transmission device according to claim 3, wherein
based on the decision to request the proxy transmission, the decision unit is further configured to:
request the proxy transmission from the plurality of second information transmission devices each of which is the target of the short-range communication; and
select the second information transmission device from the plurality of second information transmission devices that have sent the reply indicating that the proxy transmission is available, wherein
the second information transmission device is the request destination of the proxy transmission, and
the second information transmission device is selected based on the profile information of the plurality of second information transmission devices.

5. The first information transmission device according to claim 1, further comprising:
a communication unit configured to receive a request of the proxy transmission from a third information transmission device; and
a determination unit configured to determine availability of the proxy transmission requested from the third information transmission device, wherein the availability is determined based on the profile information of the first information transmission device.

6. The first information transmission device according to claim 5, wherein
based on the determination that the proxy transmission is available and the first information transmission device is selected as a request destination by a request source of the proxy transmission, the transmission unit is further configured to transmit the transmission data transmitted from the request source by the short-range communication to the server by the long-range communication.

7. The first information transmission device according to claim 1, wherein the profile information further includes at least one of identification information, position information, a detection interval of the specific event, a time-period-based history, a threshold of the remaining battery level, a transmission state, or transmission buffer information.

8. The first information transmission device according to claim 1, wherein the acquisition unit includes an imaging unit configured to acquire image data as the surrounding information.

9. The first information transmission device according to claim 1, wherein the acquisition unit includes a sensor unit configured to measure, as the surrounding information, at least one of sound, temperature, humidity, pressure, acceleration, magnetism, or a radiation dose.

10. An information transmission method, comprising:
in a first information transmission device:
  detecting occurrence of a specific event based on surrounding information;
  generating transmission data from the surrounding information based on the detection of the occurrence of the specific event;
  deciding, based on profile information at least including a remaining battery level, a destination of the generated transmission data;
  deciding, based on the profile information, to request proxy transmission;
  deciding a second information transmission device as the destination of the generated transmission data based on a decision to request the proxy transmission;
  deciding a server as the destination of the generated transmission data based on a decision not to request the proxy transmission;
  transmitting the transmission data to the decided destination;
  transmitting the transmission data to the second information transmission device by a short-range communication based on the decision of the second information transmission device as the destination of the transmission data; and
  transmitting the transmission data to the server by a long-range communication based on the decision of the server as the destination of the transmission data.

11. An information transmission system, comprising:
a plurality of information transmission devices configured to perform a short-range communication, wherein
each information transmission device of the plurality of information transmission devices includes:
  an acquisition unit configured to acquire surrounding information;
  a detection unit configured to detect occurrence of a specific event based on the acquired surrounding information;
  a generation unit configured to generate transmission data from the surrounding information based on the detection of the occurrence of the specific event;
  a management unit configured to manage profile information at least including a remaining battery level;
  a decision unit configured to:
    decide, based on the profile information, to request proxy transmission;
    decide an information transmission device of the plurality of information transmission devices as a destination of the transmission data based on a decision to request the proxy transmission; and
    decide a server as the destination of the transmission data based on a decision not to request the proxy transmission; and
  a transmission unit configured to
    transmit the transmission data to the decided destination,
a first information transmission device of the plurality of information transmission devices is configured to:
  serve as a request source of the proxy transmission; and
  transmit the transmission data to a second information transmission device of the plurality of information transmission devices by the short-range communication, and
the second information transmission device is configured to:
  serve as a request destination of the proxy transmission; and
  transmit the transmission data transmitted from the first information transmission device to the server by a long-range communication.

* * * * *